US012534271B2

(12) United States Patent
Dais et al.

(10) Patent No.: US 12,534,271 B2
(45) **Date of Patent: *Jan. 27, 2026**

(54) STORAGE BAG WITH VISUALLY DISTINCT FEATURES PROVIDING THE BAG WITH AN ASYMMETRIC APPEARANCE

(71) Applicant: S.C. Johnson & Son, Inc., Racine, WI (US)

(72) Inventors: Brian C. Dais, Saginaw, MI (US); Imtiaz A. Musaliar, Racine, WI (US); Bunlim Ly, Ann Arbor, MI (US); Jonathan David Horn, Vernon Hills, IL (US); Pamela J. Weisenberger, Racine, WI (US); Jose Porchia, Greenfield, WI (US); Charles P. Althoff, Brooklyn, NY (US); Erica Eden Cohen, New York, NY (US)

(73) Assignee: S.C. Johnson & Son, Inc., Racine, WI (US)

( * ) Notice: Subject to any disclaimer, the term of this patent is extended or adjusted under 35 U.S.C. 154(b) by 178 days.

This patent is subject to a terminal disclaimer.

(21) Appl. No.: 13/804,234

(22) Filed: Mar. 14, 2013

(65) Prior Publication Data

US 2013/0195384 A1 Aug. 1, 2013
US 2017/0190475 A9 Jul. 6, 2017

Related U.S. Application Data

(63) Continuation-in-part of application No. 13/631,617, filed on Sep. 28, 2012.

(51) Int. Cl.
*B65D 33/25* (2006.01)
*B60R 16/02* (2006.01)
(Continued)

(52) U.S. Cl.
CPC .............. *B65D 33/16* (2013.01); *B60R 16/02* (2013.01); *B65D 33/004* (2013.01);
(Continued)

(58) Field of Classification Search
CPC ................ B65D 33/25; B65D 33/2533; B65D 33/2541; B65D 33/2516; B65D 33/255;
(Continued)

(56) References Cited

U.S. PATENT DOCUMENTS 144,238 A 11/1873 Stow
3,443,720 A * 5/1969 Al-Roy ........................ 220/791
(Continued)

FOREIGN PATENT DOCUMENTS

CN 101511694 A 8/2009
CN 201678131 U 12/2010
(Continued)

OTHER PUBLICATIONS

JP2004231290Translation (Year: 2004).*
(Continued)

*Primary Examiner* — Nathan J Newhouse
*Assistant Examiner* — Nina K Attel

(57) ABSTRACT

A storage bag is provided with visually distinct features that facilitate opening and closing of the bag. The visually distinct features result in the bag having an asymmetric appearance about one or more imaginary lines along the bag. The visually distinct features and resulting asymmetries provide a visual cue for a user as to how the bag should be grasped when being opened. The visually distinct features, as well as other features of the bag, may also facilitate manufacturing of the bag.

12 Claims, 31 Drawing Sheets

(51) Int. Cl.
*B65D 33/00* (2006.01)
*B65D 33/16* (2006.01)
*B67B 7/00* (2006.01)

(52) U.S. Cl.
CPC ....... *B65D 33/007* (2013.01); *B65D 33/2508* (2013.01); *B65D 33/255* (2013.01); *B67B 7/00* (2013.01)

(58) Field of Classification Search
CPC ............ B65D 33/2558; B65D 33/2591; B65D 33/2508; B65D 33/2525; B65D 33/2566; B65D 33/007; B65D 2543/00833; B65D 2543/00842; B65D 33/2575; B65D 33/2583; B65D 33/2584; B65D 33/2585; B65D 33/2586; B65D 33/25865; B65D 33/2587; B65D 33/2588; B65D 33/2589; B65D 33/259; A44B 19/16
USPC ... 383/35, 63–65, 61.1, 210, 210.1, 211, 71, 383/77; 206/528, 530, 532, 449; 220/793, 833, 839
See application file for complete search history.

(56) References Cited

U.S. PATENT DOCUMENTS 3,508,473 A 4/1970 Ericson
3,762,542 A 10/1973 Grimes
4,363,345 A 12/1982 Scheibner
4,372,014 A 2/1983 Simpson
4,479,244 A 10/1984 Ausnit
4,654,878 A 3/1987 Lems
4,658,433 A 4/1987 Savicki
4,756,629 A 7/1988 Tilman et al.
D297,306 S 8/1988 King
4,925,316 A 5/1990 Van Erden et al.
4,960,637 A 10/1990 Biczenczuk
5,009,828 A 4/1991 McCree
5,070,584 A 12/1991 Dais et al.
D323,979 S 2/1992 Forman et al.
5,118,202 A 6/1992 Bruno
5,129,734 A 7/1992 Van Erden
5,140,727 A 8/1992 Dais et al.
5,259,904 A 11/1993 Ausnit
5,308,666 A 5/1994 Borchardt
5,356,222 A 10/1994 Kettner et al.
5,369,847 A * 12/1994 Naya et al. ................ 24/30.5 R
5,382,094 A 1/1995 Ausnit
5,397,182 A 3/1995 Gaible et al.
5,448,807 A 9/1995 Herrington, Jr.
5,482,375 A 1/1996 Richardson et al.
5,527,112 A 6/1996 Dais et al.
5,554,093 A 9/1996 Porchia et al.
5,575,747 A 11/1996 Dais et al.
5,611,627 A 3/1997 Belias et al.
5,618,111 A 4/1997 Porchia et al.
5,647,100 A 7/1997 Porchia et al.
5,722,128 A 3/1998 Toney et al.
5,762,231 A * 6/1998 Rider et al. ................... 220/526
5,783,012 A 7/1998 Porchia et al.
5,791,783 A 8/1998 Porchia et al.
5,832,145 A 11/1998 Dais et al.
5,885,002 A 3/1999 Reiss
5,894,947 A 4/1999 Morano
5,908,245 A 6/1999 Bost et al.
5,967,663 A 10/1999 Vaquero et al.
6,025,058 A 2/2000 Shepherd
6,040,042 A 3/2000 Dalgleish et al.
6,073,767 A * 6/2000 Cohen et al. ................. 206/363
6,135,636 A 10/2000 Randall
6,241,086 B1 6/2001 Bergh et al.
6,386,762 B1 5/2002 Randall et al.
6,446,800 B2 9/2002 Bergh et al.
6,481,891 B2 11/2002 Yeager
6,594,872 B2 7/2003 Cisek
6,698,587 B2 3/2004 Bergh et al.
6,786,712 B2 9/2004 Cisek
6,808,666 B2 10/2004 Fukumori et al.
6,874,938 B2 4/2005 Price et al.
6,877,898 B2 4/2005 Berich et al.
6,953,542 B2 10/2005 Cisek
6,983,845 B2 1/2006 Shah et al.
7,033,077 B2 4/2006 Taylor
7,077,570 B2 7/2006 Fukumori et al.
7,134,788 B2 11/2006 Hsiang
7,171,730 B2 2/2007 Kasai
7,260,871 B2 8/2007 Borchardt et al.
7,267,856 B2 9/2007 Patel et al.
D557,148 S 12/2007 Kapinos, Sr.
7,410,675 B2 8/2008 Busch et al.
7,435,462 B2 10/2008 Edgecombe
7,452,131 B2 11/2008 Kettner et al.
7,543,361 B2 6/2009 Borchardt et al.
7,556,429 B2 7/2009 Taheri
D597,857 S 8/2009 Lin
D602,377 S 10/2009 Lin
7,611,284 B2 11/2009 Borchardt et al.
7,651,271 B2 1/2010 Withers
7,674,040 B2 3/2010 Dowd et al.
7,716,901 B2 5/2010 Price
7,743,474 B2 6/2010 May
7,784,160 B2 8/2010 Dais et al.
D623,075 S 9/2010 Blythe
7,886,412 B2 2/2011 Dais et al.
D634,645 S 3/2011 LaFauci et al.
7,904,995 B2 3/2011 Bois
7,946,766 B2 5/2011 Dais et al.
7,967,509 B2 6/2011 Turvey et al.
D642,069 S 7/2011 LaFauci et al.
D642,070 S 7/2011 LaFauci et al.
8,021,048 B2 9/2011 Ackerman
8,025,442 B2 9/2011 Paulin
8,061,898 B2 11/2011 Pawloski et al.
8,075,186 B2 12/2011 Borchardt et al.
8,096,329 B2 1/2012 Thuot et al.
8,104,612 B2 1/2012 Fu et al.
8,157,444 B2 4/2012 Broering et al.
8,192,085 B2 6/2012 Pawloski et al.
8,197,138 B2 6/2012 Turvey
8,197,139 B2 6/2012 Turvey et al.
8,622,206 B2 1/2014 Miller et al.
9,085,393 B2 7/2015 Katada et al.
2003/0138171 A1 7/2003 Kikuchi
2003/0177619 A1 9/2003 Cisek
2003/0202720 A1 10/2003 VandenHeuvel et al.
2003/0205497 A1 11/2003 Strickland
2004/0042688 A1 3/2004 Lee
2004/0078940 A1 4/2004 Ishizaki
2004/0128805 A1 7/2004 Fukumori et al.
2004/0130058 A1 7/2004 Fukumori et al.
2004/0179754 A1 9/2004 Taheri
2005/0063616 A1 3/2005 Chang
2005/0276524 A1 12/2005 Taheri
2005/0281489 A1 12/2005 Yeh et al.
2006/0188180 A1 8/2006 Otsubo
2007/0098308 A1 5/2007 Taheri
2008/0063325 A1* 3/2008 Miller et al. .................. 383/211
2008/0105679 A1 5/2008 Ballard
2008/0159662 A1 7/2008 Dowd et al.
2008/0169290 A1 7/2008 Mangiardi
2008/0226203 A1 9/2008 Dais et al.
2009/0154843 A1 6/2009 May
2009/0324141 A1 12/2009 Dais et al.
2010/0021090 A1 1/2010 Wilske
2010/0142859 A1 6/2010 Cushman
2010/0303390 A1 12/2010 Ackerman et al.
2011/0044565 A1 2/2011 Pawloski et al.
2011/0044566 A1 2/2011 Fish et al.
2011/0176751 A1 7/2011 Anzini et al.
2011/0238598 A1 9/2011 Borowski et al.
2011/0268373 A1 11/2011 Polland
2011/0274376 A1 11/2011 Evans
2011/0311168 A1 12/2011 Pawloski

(56) References Cited

U.S. PATENT DOCUMENTS

| | | | | |
|---|---|---|---|---|
| 2011/0311169 | A1* | 12/2011 | Smith | B65D 33/255 383/63 |
| 2012/0033899 | A1 | 2/2012 | Takamura | |
| 2012/0099806 | A1 | 4/2012 | Turvey et al. | |
| 2012/0141049 | A1 | 6/2012 | Paulin | |
| 2014/0056545 | A1 | 2/2014 | Fish et al. | |
| 2014/0093193 | A1 | 4/2014 | Dais et al. | |

FOREIGN PATENT DOCUMENTS

| | | | | |
|---|---|---|---|---|
| CN | 102333704 | A | | 1/2012 |
| CN | 102395291 | A | | 3/2012 |
| CN | 104884359 | A | | 9/2015 |
| EP | 0 089 680 | A2 | | 3/1983 |
| EP | 1 375 368 | A2 | | 1/2004 |
| EP | 1 204 560 | B1 | | 3/2004 |
| JP | S47-7223 | U | | 9/1972 |
| JP | 61-203355 | | | 9/1986 |
| JP | 62-146159 | A | | 6/1987 |
| JP | 04-119209 | A | | 4/1992 |
| JP | H5-76309 | U | | 10/1993 |
| JP | 30-18639 | U | | 11/1995 |
| JP | 08-337253 | A | | 12/1996 |
| JP | 09-511974 | A | | 12/1997 |
| JP | 10-194305 | A | | 7/1998 |
| JP | 2001-240074 | A | | 9/2001 |
| JP | 2003-104394 | A | | 4/2003 |
| JP | 2004-142746 | A | | 5/2004 |
| JP | 2004-231290 | A2 | | 8/2004 |
| JP | 2004-231920 | A2 | | 8/2004 |
| JP | 2004231290 | A | * | 8/2004 |
| JP | 2005-306437 | A | | 11/2005 |
| JP | 2006-306435 | A | | 11/2006 |
| JP | 2009057107 | A | * | 3/2009 |
| JP | 3153727 | U | | 9/2009 |
| JP | 2010-030627 | A | | 2/2010 |
| JP | 2010-120190 | A | | 6/2010 |
| JP | 2010-163192 | A | | 7/2010 |
| JP | 2011-104334 | A | | 6/2011 |
| JP | 2011-178438 | A | | 9/2011 |
| JP | 2012-056617 | A2 | | 3/2012 |
| JP | 2012126454 | A | * | 7/2012 |
| MX | PA02001818 | A | | 8/2002 |
| MX | 2009002428 | A | | 3/2009 |
| WO | 01/14217 | A1 | | 3/2001 |
| WO | 2006/127739 | A2 | | 11/2006 |
| WO | 2007/143648 | A2 | | 12/2007 |
| WO | 2090/106935 | A2 | | 9/2009 |

OTHER PUBLICATIONS

PCT/US2013/061916 International Search Report dated Nov. 27, 2013.
Written Opinion mailed on Nov. 27, 2013, in corresponding International Application No. PCT/US2013/061916.
Picture of Ziploc® Brand Bag—Quart Size Storage Bag. Two (2) pictures taken Mar. 15, 2013.
Picture of Ziploc® Brand Bag—Sandwich Size Storage Bag. Two (2) pictures taken Mar. 15, 2013.
Canadian Official Action dated Jan. 13, 2016, issued in corresponding Canadian Patent Application No. 2,886,078.
Canadian Official Action dated Jul. 7, 2016, issued in corresponding Canadian Patent Application No. 2,886,078.
English translation of Japanese Official Action dated Oct. 4, 2016, issued in corresponding Japanese Patent Application No. 2015-534655.
Japanese Official Action dated Apr. 18, 2017, issued in corresponding Japanese Patent Application No. 2015-534655, with an English translation.
Office Action dated Dec. 29, 2017, issued in corresponding Chinese Patent Application No. 201610616406.1.
Office Action (with English translation) dated Sep. 10, 2018, issued in corresponding Chinese Patent Application No. 201610616406.1.
Office Action (with English translation) dated Sep. 12, 2018, issued in corresponding Japanese Patent Application No. 2017-157711.
Office Action mailed Jul. 30, 2018, issued in corresponding Chinese Patent Application No. 201610921899.X.
Office Action mailed Aug. 14, 2018, issued in corresponding Mexican Patent Application No. MX/a/2018/002289.
Office Action mailed Aug. 22, 2018, issued in corresponding Mexican Patent Application No. MX/a/2015/004033.
Office Action mailed May 22, 2018, issued in corresponding Japanese Patent Application No. 2017-133100.
Office Action mailed May 15, 2018, issued in corresponding Japanese Patent Application No. 2017-157711.
Office Action (with English translation) dated Oct. 23, 2018, issued in corresponding Japanese Patent Application No. 2017-254201.
Office Action (with English translation) dated Feb. 26, 2019, issued in corresponding Mexican Patent Application No. MX/a/2018/002289.
Office Action (with English translation) dated Jan. 4, 2019, issued in corresponding Chinese Patent Application No. 201810023069.4.
Office Action (with English translation) dated Aug. 22, 2018, issued in corresponding Chinese Patent Application No. 201710617576.6.
Office Action (with English translation) dated Mar. 11, 2019, issued in corresponding Chinese Patent Application No. 201610616406.1.
Office Action (with English translation) dated Jan. 30, 2019, issued in corresponding Chinese Patent Application No. 201610921899.X.
Office Action dated Mar. 5, 2019, issued in corresponding Chinese Patent Application No. 201810045452.X.
Office Action (with English translation) dated Apr. 10, 2019, issued in corresponding Chinese Patent Application No. 201710617576.6.
Office Action dated Feb. 27, 2019 (and mailed May 7, 2019), issued in corresponding Mexican Patent Application No. MX/a/2015/004033.
Office Action (with English translation) dated May 27, 2019, issued in corresponding Japanese Patent Application No. 2017-254201.
Office Action (with English translation) dated Jun. 20, 2019, issued in corresponding Chinese Patent Application No. 201810023069.4.
Office Action (with English translation) dated Feb. 5, 2019, issued in corresponding Japanese Patent Application No. 2017-13310.
Office Action (with English translation) dated Aug. 21, 2019, issued in corresponding Chinese Patent Application No. 201710617576.6.
Office Action (with English translation) dated May 11, 2021, issued in corresponding Mexican Patent Application No. MX/a/2016/017401.
Office Action (with English translation) dated Jul. 27, 2021, issued in corresponding Japanese Patent Application No. 2020-133267.
Office Action (with English translation) dated Jun. 22, 2021, issued in corresponding Chinese Patent Application No. 201610616406.1.
Office Action (with English translation) dated Jun. 22, 2021, issued in corresponding Chinese Patent Application No. 201810023069.4.

* cited by examiner

STORAGE BAG WITH VISUALLY DISTINCT FEATURES PROVIDING THE BAG WITH AN ASYMMETRIC APPEARANCE

This application is a continuation-in-part of copending U.S. patent application Ser. No. 13/631,617, filed Sep. 28, 2012.

BACKGROUND

1. Field of the Invention

Our invention relates to a storage bag. More specifically, our invention relates to a storage bag with features that facilitate sealing and unsealing the bag, as well as a storage bag that includes features for distinguishing the bag from other storage bags. Our invention also relates to a method of unsealing a storage bag.

2. Related Art

Storage bags made from flexible plastic materials are well known. Such storage bags are made in a variety of sizes, and can be used to contain a variety of items, including food, utensils, clothing, tools, etc. Such storage bags often include some type of zipper-like closure mechanism to releasably seal the interior of the bag. Plastic storage bags with closure mechanisms are sold by the assignee of the present application under the ZIPLOC® trademark.

The closure mechanisms of plastic storage bags often include two interlocking structures that are provided on or near lips at the top of the bag. In order to seal the closure mechanism, a user will run his or her fingers along the closure mechanism, squeezing the interlocking members together. It is often easier to cause the interlocking members to become fully engaged throughout their length if the operation is performed in a certain manner, although a user may not necessarily be aware of the proper technique for performing the operation.

To open the bag, the user grasps the lips, and pulls the interlocking structures apart. Plastic storage bags, however, usually have slick surfaces that are difficult to grasp. Moreover, it is often easier to pull the interlocking structures apart if the bag is grasped in certain areas, and a certain motion is applied to the interlocking members. As with sealing the bag, however, a user may not necessarily be aware of the proper technique to unseal the bag.

Due to their vast functionality, storage bags are often placed in locations with other storage bags. For example, storage bags containing different products are often stored in a refrigerator or in a freezer. In such cases, it can be difficult to quickly or easily discern the contents of one bag from another.

It would be beneficial, therefore, to provide storage bags with features for making the storage bags easier to seal and to unseal. Further, it would be beneficial to provide storage bags that can be easily distinguished from each other.

SUMMARY OF THE INVENTION

According to one aspect, our invention provides a storage bag. The storage bag includes a first side surface and a second side surface. The second side surface is connected to the first side surface, and the connected first and second side surfaces forming an interior of the bag with an opening to the interior. A first closure profile is connected to the first side surface and positioned adjacent to the opening of the bag, with the first closure profile including an interlocking member that extends between a first side of the first closure profile and a second side of the first closure profile, and with the first closure profile forming a lip between the interlocking member and a top edge of the first closure profile. A second closure profile is connected to the second side surface and positioned adjacent to the opening of the bag, with the second closure profile including an interlocking member that extends between a first side of the second closure profile and a second side of the second closure profile, and with the second closure profile forming a lip between the interlocking member and a top edge of the second closure profile. A portion of the top edge of the first closure profile is offset from a portion the top edge of the second closure profile when the bag is viewed towards the first side surface, with the offset portions of the top edges of the first and second closure portions not being mirror images of each other about any plane that extends through at least one of the first closure profile and the second closure profile at a perpendicular angle to the at least one of the first closure profile and the second closure profile. An outline of the area defined by the first side surface and the first closure profile cannot be matched to an outline of the area defined by the second side surface and the second closure profile.

According to another aspect, our invention provides a storage bag. The storage bag includes a first side surface extending in an x-direction and in a y-direction that is orthogonal to the x-direction. A second side surface extends in the x-direction and in the y-direction, with the second side surface connected to the first side surface in a z-direction that is orthogonal to the x- and y-directions, the connected first and second side surfaces forming an interior of the bag with an opening to the interior. The bag further includes at least one pair of visually distinct features, with at least one of the visually distinct features provided on one side of a plane that bisects the first or second side surfaces in the x-direction, and with at least one of the visually distinct features provided on the other side of the plane. The bag appears to be asymmetric about the plane as a result of the at least one pair of visually distinct features.

According to another aspect, our invention provides a storage bag. The storage bag includes a first side surface extending in an x-direction and in a y-direction that is orthogonal to the x-direction. A second side surface extends in the x-direction and in the y-direction, with the second side surface connected to the first side surface in a z-direction that is orthogonal to the x- and y-directions, the connected first and second side surfaces forming an interior of the bag with an opening to the interior. The bag further includes at least one pair of visually distinct areas, with at least one of the visually distinct areas provided on one side of a plane that bisects the first or second side surfaces in the x-direction, and with at least one of the visually distinct areas provided on the other side of the plane. The bag appears to be asymmetric about the plane as a result of the at least one pair of visually distinct areas.

A storage bag is provided according to yet another aspect of our invention. The storage bag includes a first side surface and a second side surface. The second side surface is connected to the first side surface, with the connected first and second side surfaces forming an interior of the bag with an opening to the interior. A first closure profile is connected to the first side surface and positioned adjacent to the opening of the bag, with the first closure profile including an interlocking member that extends between a first side of the first closure profile and a second side of the first closure profile, and with the first closure profile forming a lip between the interlocking member and a top edge of the first closure profile. The top edge of the first closure profile extends a distance H1 from the interlocking member of the first closure profile at the first side of the first closure profile. A second closure profile is connected to the second side surface and positioned adjacent to the opening of the bag, with the second closure profile including an interlocking member that extends between a first side of the second closure profile and a second side of the second closure profile, and with the second closure profile forming a lip between the interlocking member and a top edge of the second closure profile. The top edge of the second closure profile extends a distance H2 from the interlocking member of the second closure profile at the first side of the second closure profile. The interlocking member of the first closure profile is configured to interlock with the interlocking member of the second closure profile, and the distance H1 is greater than the distance H2 such that the top edge of the first closure profile is spaced from the top edge of the second closure profile at the first sides of the first and second closure profiles. A portion of at least one of the top edges of the first and second closure profiles is sloped relative to a portion of the other of the top edges of the first and second closure profiles.

DETAILED DESCRIPTION OF THE INVENTION

Figure 1:
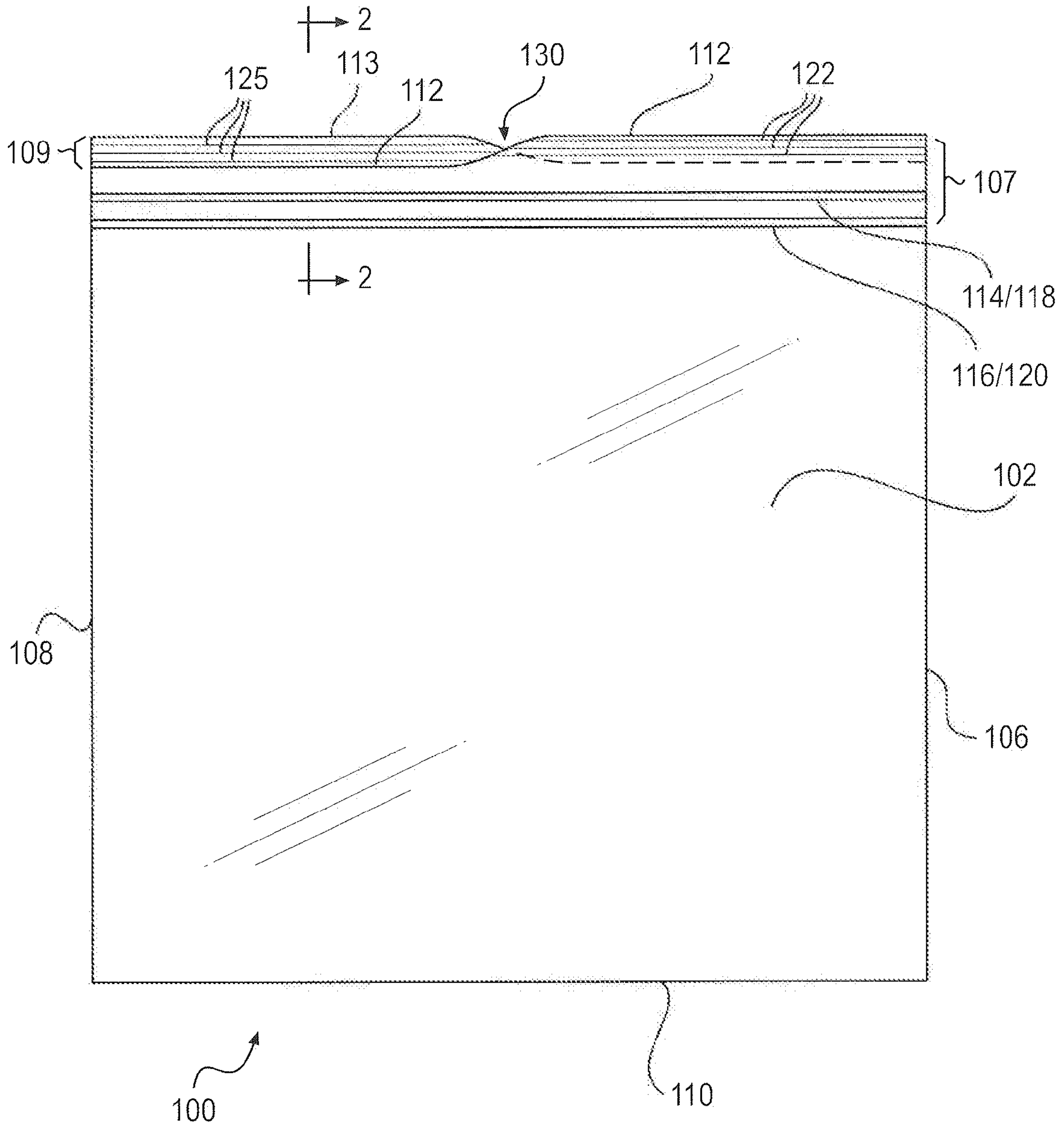
FIG. 1 is a side view of a bag according to an embodiment of the invention.

Our invention relates to a plastic storage bag that includes features that facilitate sealing and unsealing of the bag. Our invention also relates to a storage bag that includes features for distinguishing the bag from other storage bags. The features of our invention thereby provide for an easy to use and easy to distinguish plastic storage bag.

As will be apparent from the description herein, the term “bag” encompasses a broad range of structures designed to contain items, such as pouches, envelopes, packets, and the like. In general, the term bag, as used herein, simply means a somewhat flexible container with an opening, with the bag being capable of carrying any number of items.

FIGS. 1 to 5 are views of a bag 100 according to an embodiment of the invention. The bag 100 includes a first side surface 102 and a second side surface 104. The first and second side surfaces 102 and 104 are connected along edges 106 and 108, and the first and second side surfaces 102 and 104 are also connected at a bottom edge 110 of the bag 100. An opening 103 to the interior of the bag 100 is formed adjacent to the edges 112 and 113 that are defined by the closure profiles 107 and 109, as will be described below. The first and second sides 102 and 104 may be made from a substantially transparent plastic, such as the plastics discussed below, thereby allowing the contents of the interior of the bag to be easily determined. Alternatively, the first and second side surfaces 102 and 104 can be made substantially opaque, or of a completely opaque material.

In some embodiments, the side surfaces 102 and 104 are directly connected together at the edges 106, 108, and 110. The side surfaces 102 and 104 may be, for example, laminated together at the edges 106, 108, and 110. In other embodiments, however, additional surfaces may be provided to connect the first and second side surfaces 102 and 104. For example, a gusset-type connection may be formed at the edges 106, 108, and 110 between the first and second side surfaces 102 and 104, thereby allowing the first and second side surfaces 102 and 104 to be moved apart to an expanded bag configuration. Along these lines, it should be noted that the term "connected," as used herein, is general a term that describes two structures that are directly attached to one another, but also encompasses structures that are connected through intermediary structures.

Figure 2:
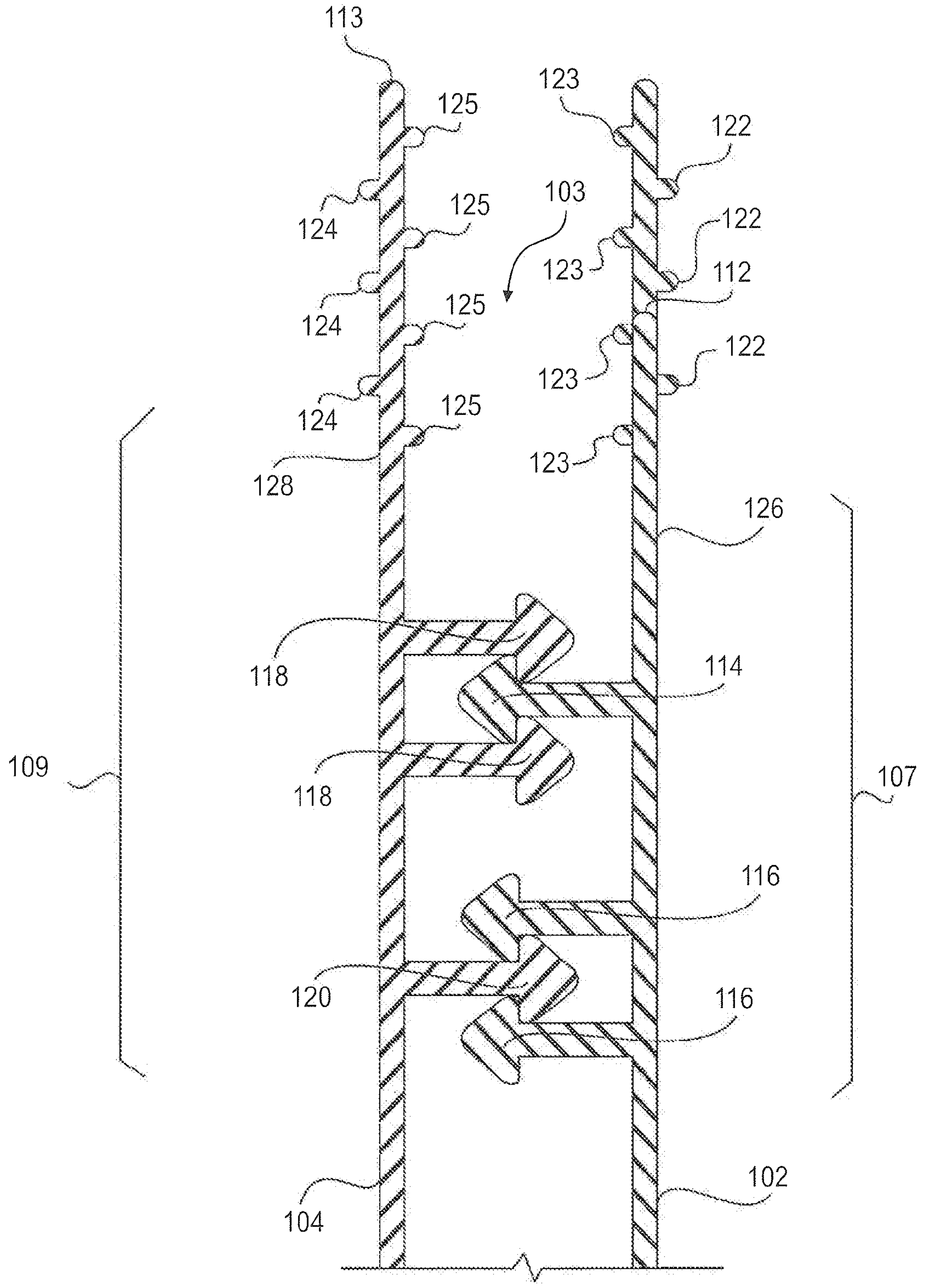
FIG. 2 is a cross-sectional view of the top end of the bag shown in FIG. 1 as taken along line 2-2.

First and second closure profiles 107 and 109 form the top portion of the bag 100, with the first and second closure profiles 107 and 109 defining the top edges 112 and 114. The closure profiles 107 and 109 include interlocking members 114, 116, 118, and 120 for sealing the opening 103 of the bag 100. As shown in FIG. 2, the interlocking member 114 extends from the first closure profile 107, and the interlocking member 118 extends from the second closure profile 109 at a position opposite to the interlocking member 114. The interlocking members 114 and 118 can be interlocked and unlocked, with the interlocking member 114 being a male-type profile that is received by the female-type interlocking member 118. Such interlocking of the interlocking members 114 and 118 will also be referred to herein as "occluding." The interlocking member 116 extends from the first closure profile 107, and the interlocking member 120 extends from the second closure profile 109. The interlocking members 116 and 120 can also be occluded in the same manner as the interlocking members 114 and 118. Interlocking members such as those depicted in FIG. 2 are often referred to as zippers, as is known in the art. Examples of different shapes and configurations of such interlocking members that could be used with the storage bag disclosed herein can be seen in U.S. Pat. Nos. 5,070,584; 7,784,160; 7,886,412; 7,946,766; and 8,061,898, and in U.S. Patent Application Publication No. 2009/0324141, the disclosures of which are incorporated by reference herein in their entirety.

The bag 100 is sealed by a user squeezing the interlocking members 114 and 116 together with the interlocking members 118 and 120. It has been found that a user can most easily perform this process by starting at the ends of the interlocking members 114, 116, 118, and 120, and then moving his or her fingers across the length of the bag. When unsealing the bag 100, the interlocking members 114, 116, 118, and 120 are pulled apart by the user grasping the lips 126 and 128 of the bag and moving the closure profiles 107 and 109 apart. As will be discussed below, it is generally easier for a user to move the closure profiles 107 and 109 apart and to unseal the interlocking members 114, 116, 118, and 120, if the lips 126 and 128 are grasped towards the center of the length of the closure profiles 107 and 109.

The interlocking members 114, 116, 118, and 120 may be configured to provide an audible sound and/or a tactile sensation when engaging each other. A variety of techniques are known for providing such audible and tactile features, with one example being the provision of indentations intermittently along the length of the profiles of interlocking members 114, 116, 118, and 120, or, more generally, making the interlocking members 114, 116, 118, and 120 discontinuous along their lengths. The indentions or structural discontinuities cause the interlocking members 114, 116, 118, and 120 to close together with a vibratory or bumpy feel, or with an audible clicking sound, or with both a bumpy feel and an audible clicking sound. An example of providing the interlocking members of a bag with audible or tactile features can be found in U.S. Pat. No. 5,140,727, the disclosure of which is incorporated by reference herein in its entirety.

It should be noted that, although the bag 100 described herein includes two pairs of interlocking members 114, 116, 118, and 120, other embodiments of the bag can include only one pair of interlocking members, i.e., a single interlocking member extending from the first closure profile of the bag that can connect to an interlocking member extending from the second closure profile of the bag. Still other embodiments can include more than two pairs of interlocking members. It should also be noted that the interlocking members 114, 116, 118, and 120 do not necessarily need to fully extend to the edges of the bag 100. For example, in some embodiments, the bag 100 may include extended sealed sections at the edges 106 and 108 of the bag 100, with the interlocking members 114, 116, 118, and 120 configured to extend only from one sealed section to the other, and not all the way to the edges 106 and 108 of the bag 100. In this regard, references herein to the interlocking members 114, 116, 118, and 120 "extending between" the sides of the closure profiles 107 and 109 do not necessarily indicate that the interlocking members 114, 116, 118, and 120 extend all the way to edges of the closure profiles 107 and 109.

The first and second side surfaces 102 and 104, and the first and second closure profiles 107 and 109, may be formed from thermoplastic materials, and by known processes that are well known in the art. For example, the side surfaces 102 and 104 may be independently extruded of thermoplastic material as a single continuous or multi-ply web, and the closure profiles 107 and 109 may be extruded of the same or different thermoplastic materials separately as continuous lengths or strands. The first and second closure profiles 107 and 109 may be integrally formed with (and thus "connected") to the side surfaces 102 and 104 of the bag 100. Alternatively, the first and second closure profiles 107 and 109 may be formed as separate structures that are attached (and thus "connected") to the first and second side walls 102 and 104, for example, by laminating the first and second closure profiles 107 and 109 to the first and second side walls 102 and 104.

Illustrative thermoplastic materials that could be used to form the bag 100 include, for example, polypropylene (PP), polyethylene (PE), metallocene-polyethylene (mPE), low density polyethylene (LDPE), linear low density polyethylene (LLDPE), ultra low density polyethylene (ULDPE), biaxially-oriented polyethylene terephthalate (BPET), high density polyethylene (HDPE), polyethylene terephthalate (PET), among other polyolefin plastomers and combinations and blends thereof. Still other materials that may be used include styrenic block copolymers, polyolefin blends, elastomeric alloys, thermoplastic polyurethanes, thermoplastic copolyesters, thermoplastic polyamides, polymers and copolymers of polyvinyl chloride (PVC), polyvinylidene chloride (PVDC), saran polymers, ethylene/vinyl acetate copolymers, cellulose acetates, polyethylene terephthalate (PET), ionomer, polystyrene, polycarbonates, styrene acryloacrylonitrile, aromatic polyesters, linear polyesters, and thermoplastic polyvinyl alcohols. Those skilled in the art will recognize that a wide variety of other materials may also be used to form the bag 100.

Figure 3:
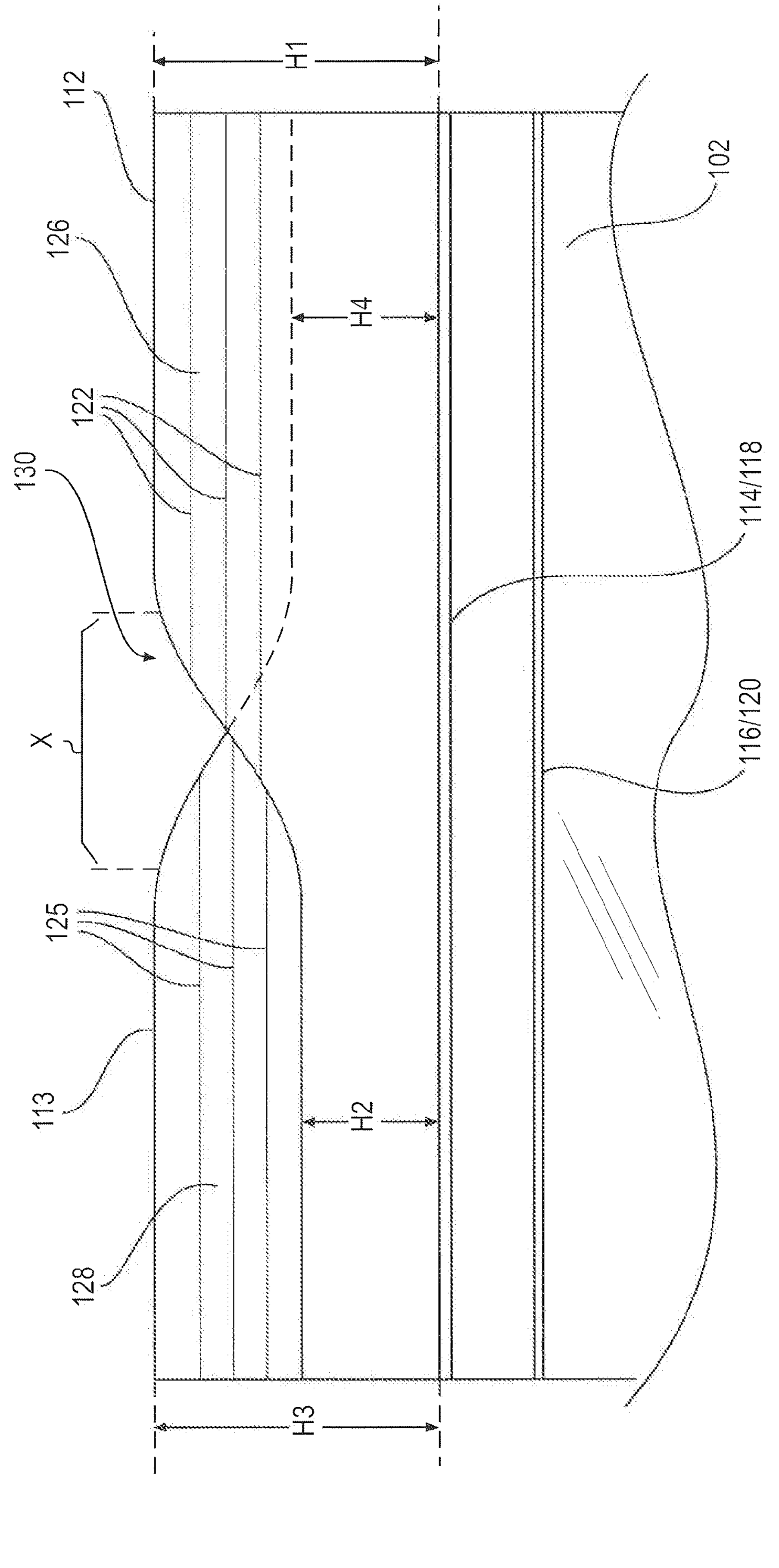
FIG. 3 is a view of the top end of the bag shown in FIG. 1.

FIG. 3 shows a detailed view of the top end of the bag 100 with the edges 112 and 113 of closure profiles 107 and 109. The bag 100 includes offset first and second lips 126 and 128 that extend from the interlocking members 114 and 118 to the top edges 112 and 113. The lips 126 and 128 are configured such that a distinct notch 130 is formed in a region X of the top edges 112 and 113 of the bag 100. It should also be noted that the top edges 112 and 113 of the lips 126 and 128 are slopped relative to each other in the region X. That is, the top edges 112 and 113 are sloped in that they appear to extend at angles relative to each other when the bag is view towards the first or second side surfaces 102 and 104.

To form the notch 130, the first lip 126 includes a first portion that extends a distance H1 from the interlocking member 114 to the top edge 112 along a portion of a length of the bag (the right side of FIG. 3). The first lip 126 also includes a second portion that extends a second distance H2 from the interlocking member 114 to the top edge 112 along another portion of the length of the bag 100 (the left side of FIG. 3). The distance H1 is greater than the distance H2, and as such, the first lip 126 includes a third portion in the region X that varies from H1 to H2 in distance from the interlocking member 114 to the top edge 112.

The second lip 128 is configured similar to the first lip 126, except that the portions of the second lip 128 are reversed from the first lip 126. The second lip 128 includes a first portion that extends a distance H3 from the interlocking member 118 to the top edge 113 (left side of FIG. 3), and a second portion that extends a distance H4 from the interlocking member 118 to the top edge 113 (right side of FIG. 3), with the distance H3 being greater than the distance H2. As such, the second lip 128 includes a third portion in the region X that varies from H3 to H4 in distance from the interlocking member 118 to the top edge 113.

The first portion of the first lip 126 extending the distance H1 is positioned adjacent to the second portion of the second lip 128 that extends the distance H4, and the second portion of the first lip 126 that extends the distance H2 is positioned adjacent to the first portion of the second lip 128 that extends the distance H3. The third portions of the first and second lips 126 and 128, which vary in distance from the respective interlocking members 114 and 118 to edges 112 and 113, are positioned adjacent to each other. Thus, the distinctive notch 130 is formed by the top edges 112 and 113 in the region X.

Figure 4:
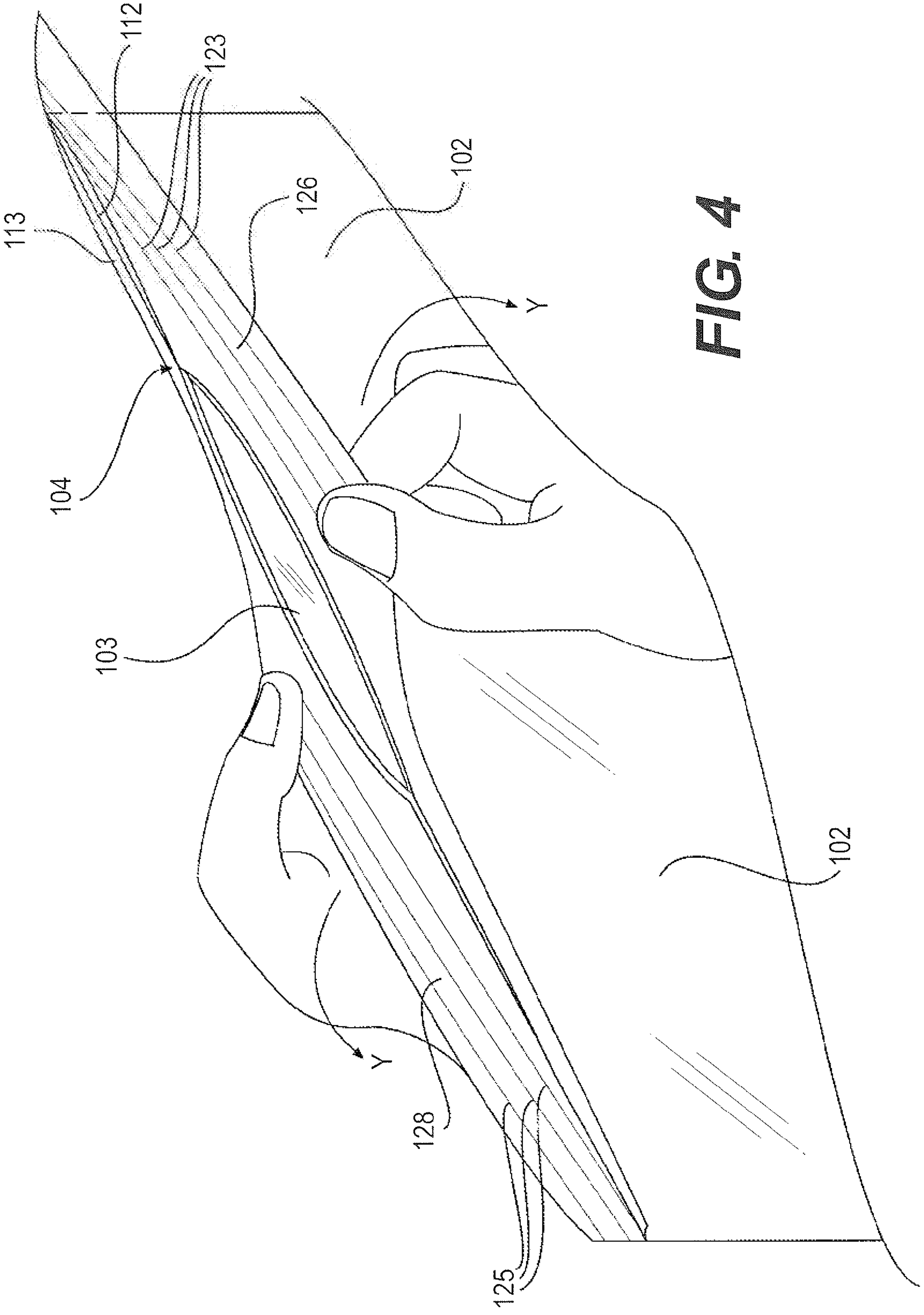
FIG. 4 is a view of the bag shown in FIG. 1 being grasped and opened.

The offset of the lips 126 and 128, and the correspondingly formed notch 130, make it easier for a user to grasp the lips 126 and 128, and to unseal the interlocking members 114, 116, 118, and 120. As shown in FIG. 4, the notch 130 provides a visual cue that leads the user to grasp the first and second lips 126 and 128 in the region X of the top edges 112 and 113 of the bag 100. And, because of their configuration, the lips 126 and 128 can easily be grasped in the region X. Moreover, when grasping the lips 126 and 128 at the region X, the user can achieve an outward rolling motion of the first and second closure profiles 107 and 109, as denoted by the arrows Y in FIG. 4. This rolling motion of the lips 126 and 128 away from each other greatly facilitates the separation of the first and second closure profiles 107 and 109, and, accordingly, makes easier the unsealing of the interlocking members 114, 116, 118, and 120.

It should be noted that, although the region X where the notch 130 is provided is at the center of the length of the bag 100 depicted in FIGS. 1 to 5, the region X and notch 130 can be offset from the center of the length of the bag 100 in other embodiments. That is, the length of the portions of the first and second lips 126 and 128 could be adjusted to provide the region X and the notch 130 at different positions along the top end of the bag 100. It should also be noted that although the distance H1 is depicted as being about equal to the distance H3 in FIG. 4, and the distance H2 is depicted as being about equal to the distance H4 in FIG. 4, in other embodiments, these distances need not be equal. Instead, H1 and H3 can be different, and H2 and H4 can be different. Indeed, such differences may provide even further visual cues as to the different lips 126 and 128, making it even easier for the user to determine where to grasp the lips 126 and 128.

As shown in FIGS. 1 and 2, gripping ridges 122, 124, and 125 are provided on the surfaces of the first and second lips 126 and 128 in order to further facilitate the grasping of the lips 126 and 128. Such gripping ridges 122, 124, and 125 can be provided on both of the inside and outside surfaces of the first and second lips 126 and 128, on only the inside or outside surfaces of the first and second lips 126 and 128, or on combinations of the inside and outside surfaces of the first and second lips 126 and 128, e.g., on the outside surface of lip 126 and the inside surface of lip 128. Further, any number of gripping ridges can be added to the inside and outside surface of the lips 126 and 128. In still other embodiments, however, no gripping ridges are provided to the bag 100.

Figure 5:
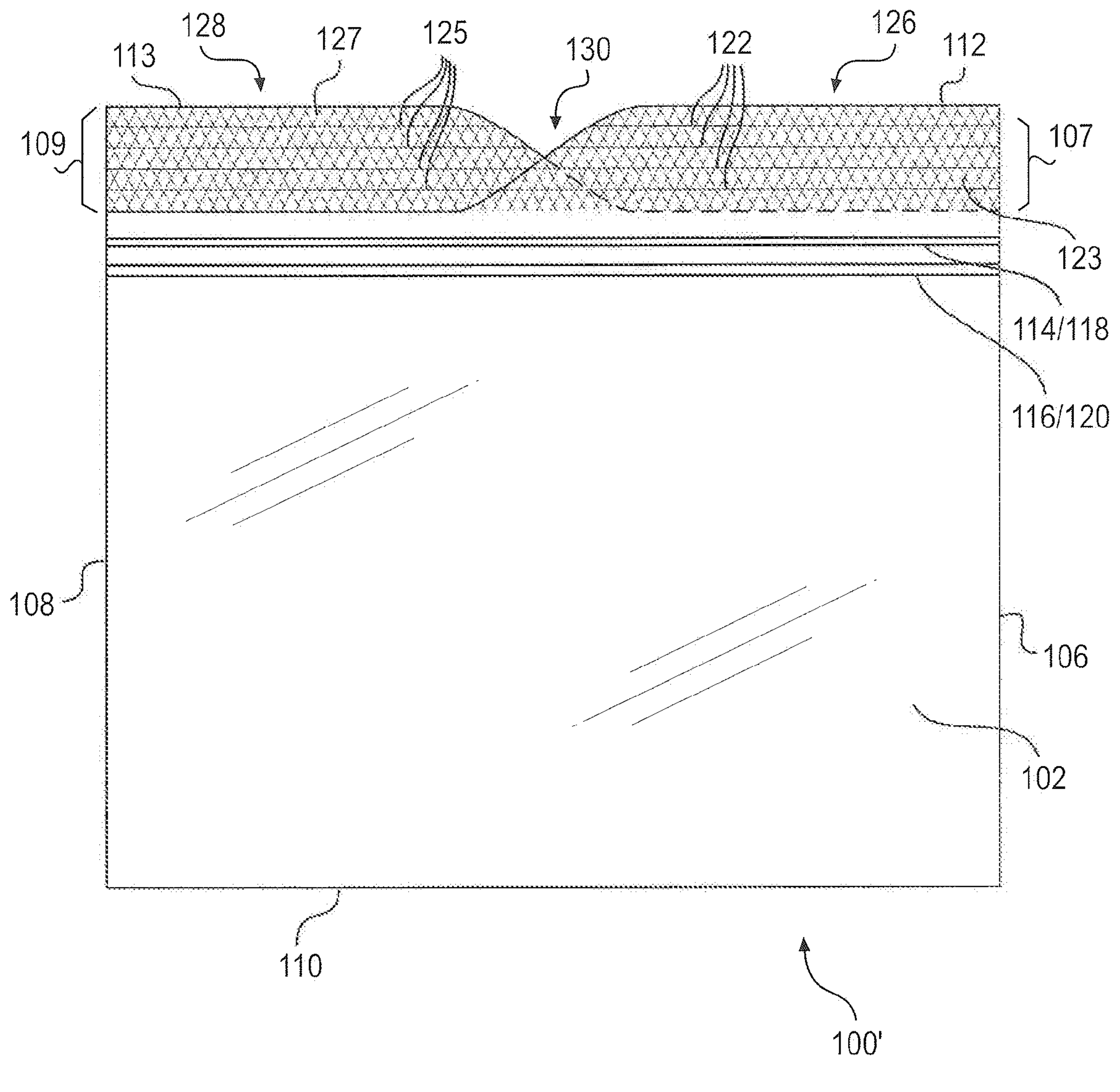
FIG. 5 is a side view of a bag according to another embodiment of the invention.

In addition to, or as an alternative to, the gripping ridges 122 and 124, the surfaces of the lips 126 and 128 may also include a texture 127, as shown in bag 100' depicted in FIG. 5. The texture 127 further facilitates gripping of the lips 126 and 128, and hence, opening of the bag 100'. Such a texture 127 may easily be formed on the lips 126 and 128 using a variety of techniques, with one example being embossing. Other techniques include ultrasonic forming and blasting with sand or water jets to abrade the surface. Regardless of the technique, when the texture 127 is added to the lips 126 and 128, the integrity of the gripping ridges 122, 123, 124, and 125 can be maintained by not forming the texture 127 on the griping ridges 122, 123, 124, and 125. That is, the gripping ridges 122, 123, 124, and 125 are not substantially disrupted by the texture 127 pattern, and, as such, the gripping ridges 122, 123, 124, and 125 extend substantially continuously along the top end of the bag 100. As will be appreciated by those skilled in the art, the texture 127 can be formed by a variety of techniques, with one example being ultrasonic embossing.

The combination of two different grip facilitating features, i.e., the gripping ridges 122, 123, 124, and 125 and the texture 127, provides for particularly effective gripping surfaces that a user can easily grasp when unsealing the interlocking members 114, 116, 118, and 120. Additionally, the texture 127 also provides another visual cue for locating the lips 126 and 128.

Figure 6:
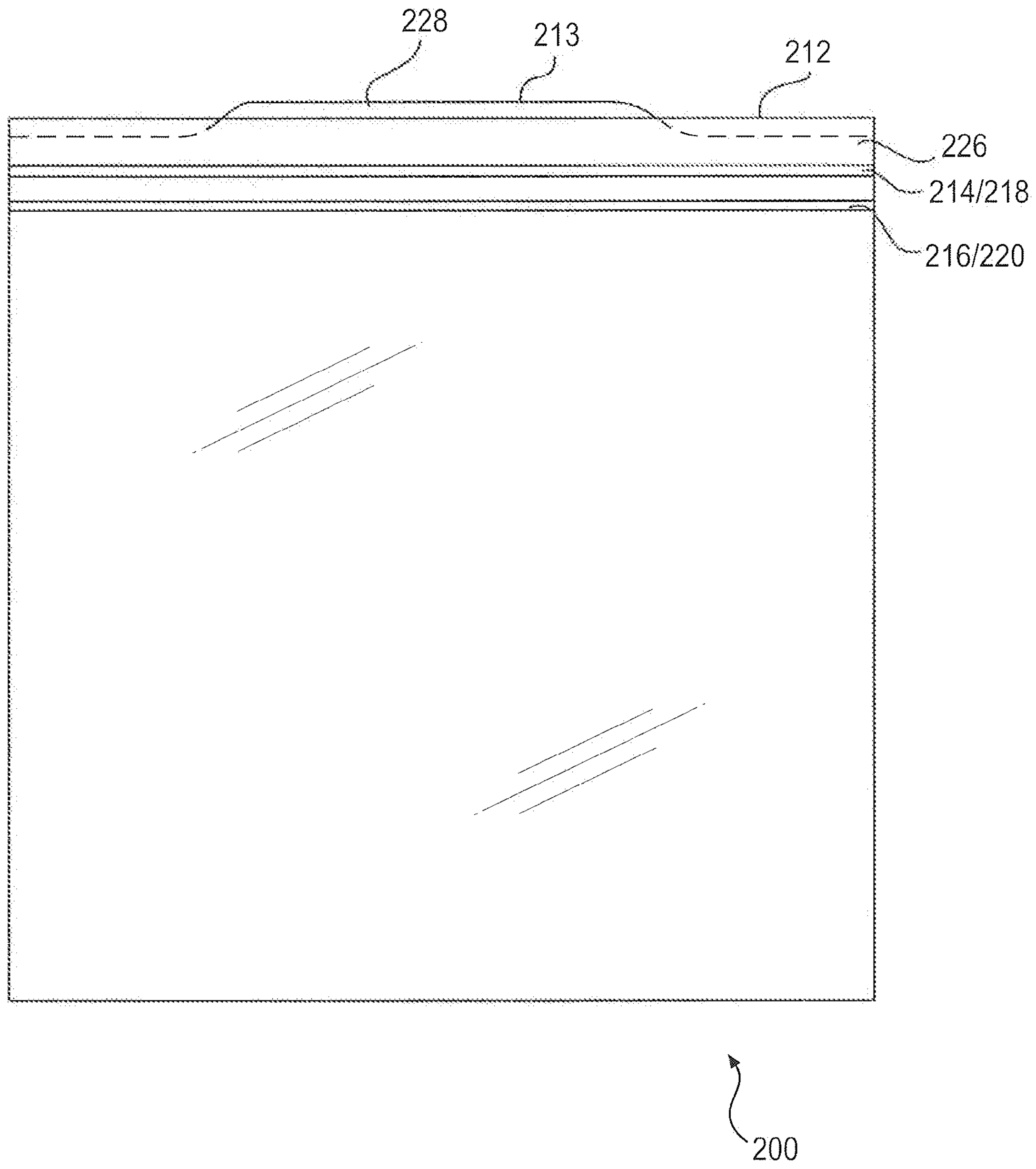
FIG. 6 is a side view of a bag according to another embodiment of the invention.
Figure 7:
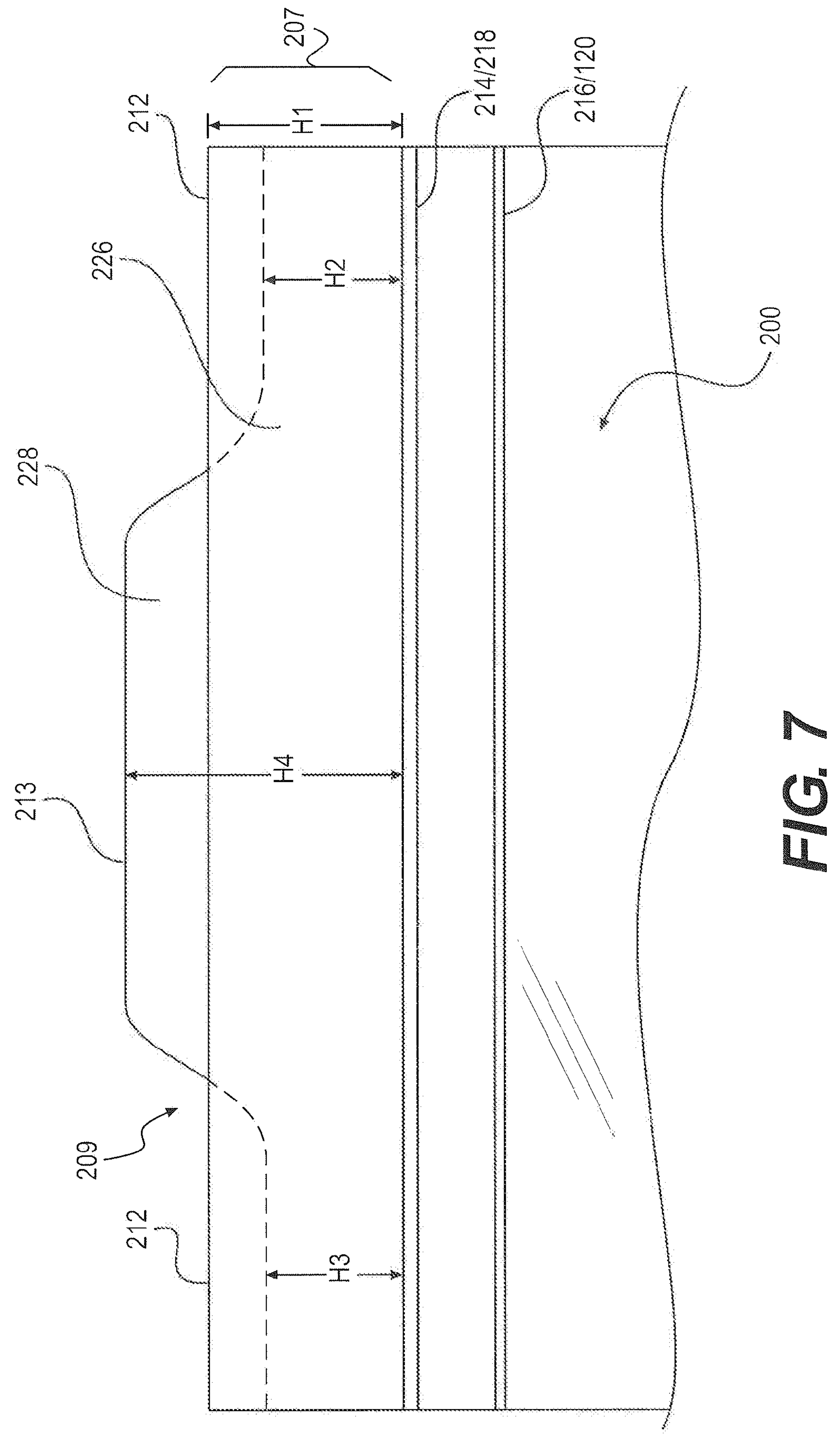
FIG. 7 is a view of the top end of the bag shown in FIG. 6.

FIGS. 6 and 7 show a bag 200 according to a second embodiment of the invention. The bag 200 is configured similar to the bag 100 described above, with the exception of the configuration of the first and second closure profiles 207 and 209. In bag 200, the first lip 226 extends a substantially constant distance H1 from the interlocking member 214 to the top edge 212 of the first closure profile 207. On the other hand, the second lip 228 of the second closure profile 209 includes a first portion that extends a distance H2 from the interlocking member 218 to the top edge 213, a second portion that extends a distance H3 from the interlocking member 218 to the top edge 213, and a third portion that extends a distance H4 from the interlocking member 218 to the top edge 213. The second lip 228 also includes portions that vary between the distances H2 to H4, and portions that vary between the distances H3 to H4. It should be noted, however, that, in an alternative embodiment, the portions of the second lip 228 that vary in distance from the interlocking member 218 to the top edge 213 can be omitted. That is, the bag 200 could be provided such that the first portion with the distance H2 transitions directly to the second portion with the distance H3, and the second portion with the distance H3 transitions directly to the third portion with the distance H4. It should also be noted that, although the distances H2 and H3 are shown as being about equal in the embodiment depicted in FIGS. 6 and 7, in other embodiments, the distances H2 and H4 are different.

The bag 200 is configured such that the distance H1 is greater than the distances H2 and H3, but the distance H1 is less than the distance H4. Thus, a portion of the lip 228 formed by the second closure profile 209 extends above the edge 212 formed by the first closure profile 207. The first and second lips 226 and 228 are therefore easily distinguishable, and the user is provided with a visual cue as to where to grasp the lips 226 and 228 in order to unseal the interlocking members 214, 216, 218, and 220. Further, the user is led to grasp the lips 226 and 228 at a center region of the bag 200 where the second lip 228 extends above the first lip 226. By grasping the lips 226 and 228 at the center region, the user can impart a rolling motion to the lips, as described above in conjunction with FIG. 4, which facilitates separation of the first and second closure profiles 207 and 209, and thus, unsealing of the interlocking members 214, 216, 218, and 220.

Figure 8:
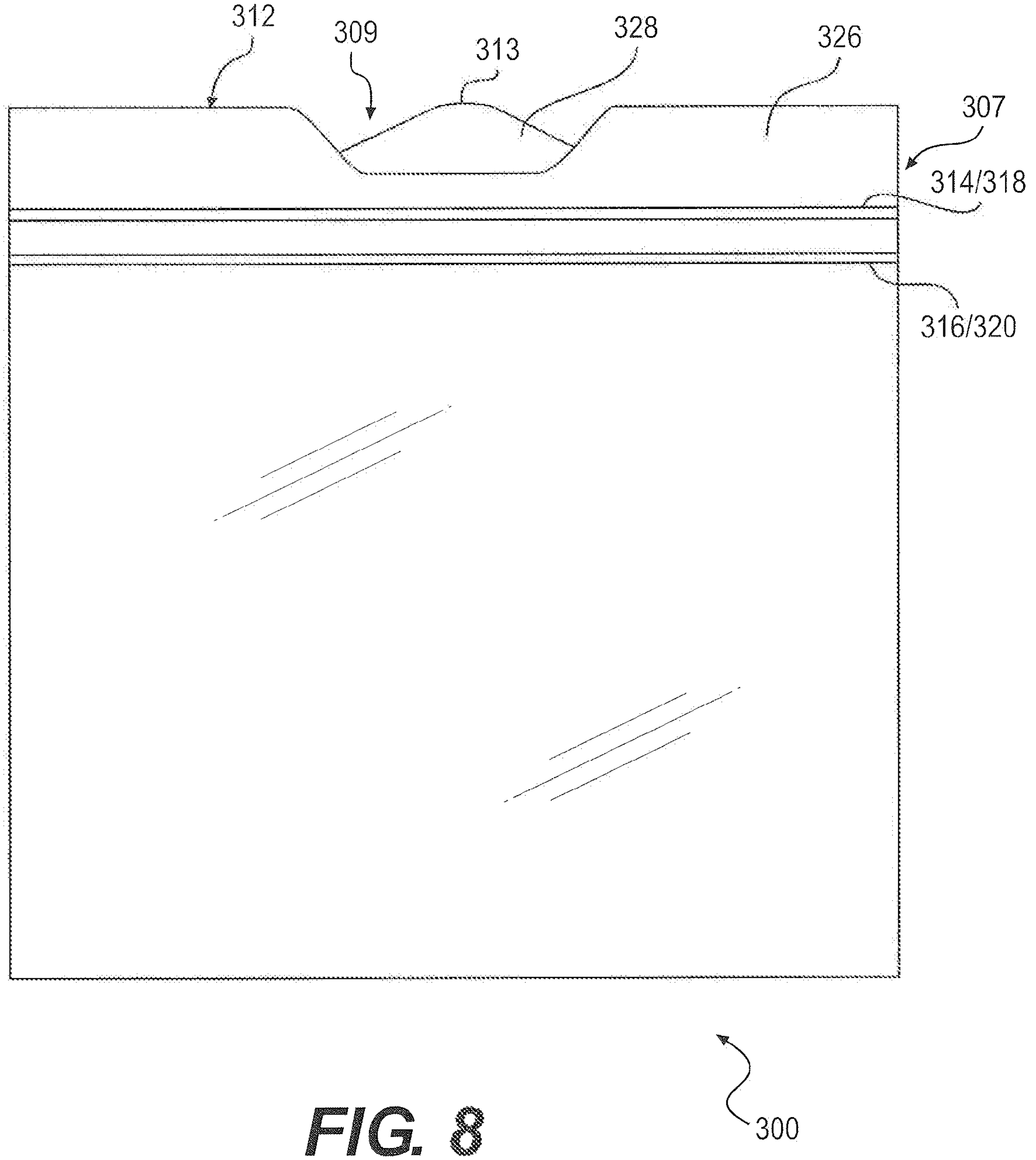
FIG. 8 is a view of a bag according to another embodiment of the invention.
Figure 9:
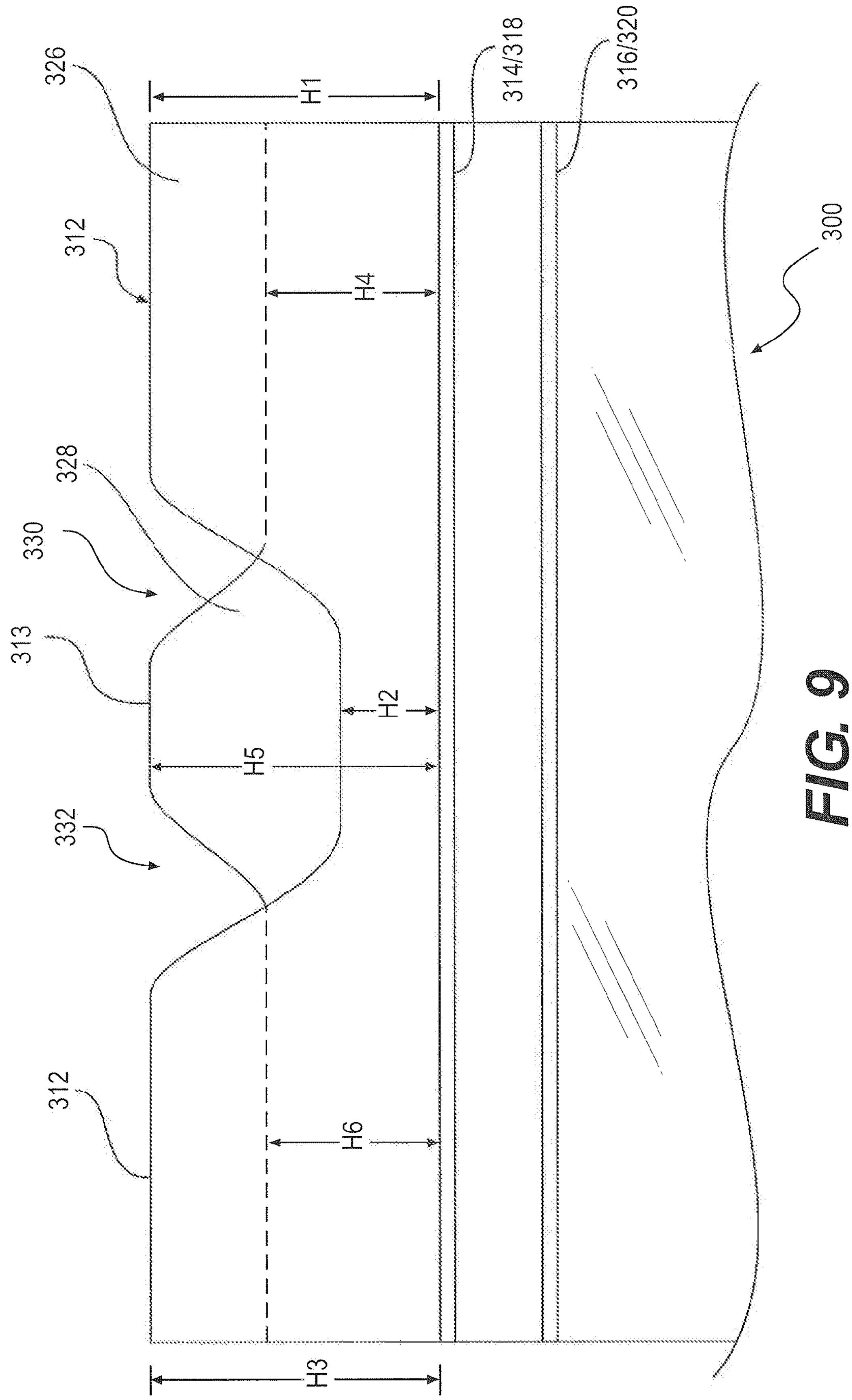
FIG. 9 is a view of the top end of the bag shown in FIG. 8.

FIGS. 8 and 9 show a bag 300 according to another embodiment of the invention. The bag 300 is configured similar to the bags 100 and 200 described above, with the exception of the first and second closure profiles 307 and 309. In this embodiment, the first lip 326 includes a first portion that extends a distance H1 from the interlocking member 314 to the edge 312 of the first closure profile 307. The first lip 326 also includes a second portion that extends a distance H2 from the interlocking member 314 to the edge 312, and a third portion that extends a distance H3 from the interlocking member 314 to the edge 312. The second lip 328 also includes three portions, with a first portion extending a distance H4 from the interlocking member 318 to the edge 313 of the second closure profile 309, a second portion extending a distance H5 from the interlocking member 318 to the top edge 313, and a third portion extending a distance H6 from the interlocking member 318 to the edge 313. The portions of the first and second lips 326 and 328 are configured so as to form two notches 330 and 332 at the top end of the bag 300. The portions of the lips 326 and 328 are also configured to form a tab, with the portion of the second lip 328 that extends the distance H5 being above the portion of the first lip 326 that extends the distance H2. The notches 330 and 332 provide visual cues that allow the user to easily distinguish between the first and second lips 326 and 328, and also to indicate that the lips 326 and 328 should be grasped at the center region of the bag 300. Along these lines, when grasping the lips 326 and 328 at the center region near the notches 330 and 332, the user can achieve an outward rolling motion that facilitates unsealing of the interlocking members 314, 316, 318, and 320, as described above.

The bag 200 is configured such that the distance H1 is greater than the distances H2 and H4, but the distance H1 is less than the distance H3. Thus, a portion of the lip 228 formed by the second closure profile 209 extends above the edge 212 formed by the first closure profile 207. The first and second lips 226 and 228 are therefore easily distinguishable, and the user is provided with a visual cue as to where to grasp the lips 226 and 228 in order to unseal the interlocking members 214, 216, 218, and 220. Further, the user is led to grasp the lips 226 and 228 at a center region of the bag 200 where the second lip 228 extends above the first lip 226. By grasping the lips 226 and 228 at the center region, the user can impart a rolling motion to the lips, as is described above in conjunction with FIG. 4, which facilitates separation of the first and second closure profiles 207 and 209, and thus, unsealing of the interlocking members 214, 216, 218, and 220.

Figure 10A:
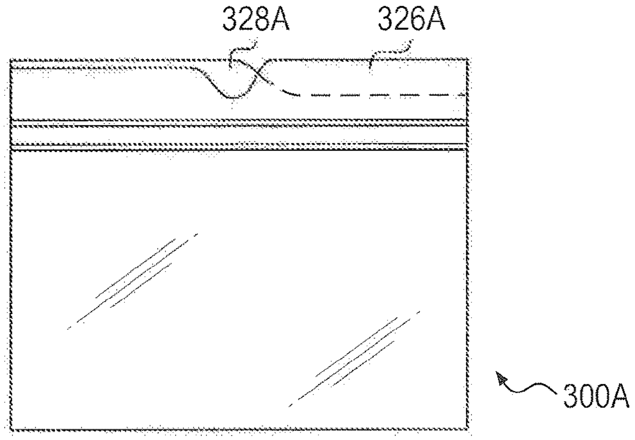
FIGS. 10A to 10C are side view of bags according to embodiments of the invention.
Figure 10B:
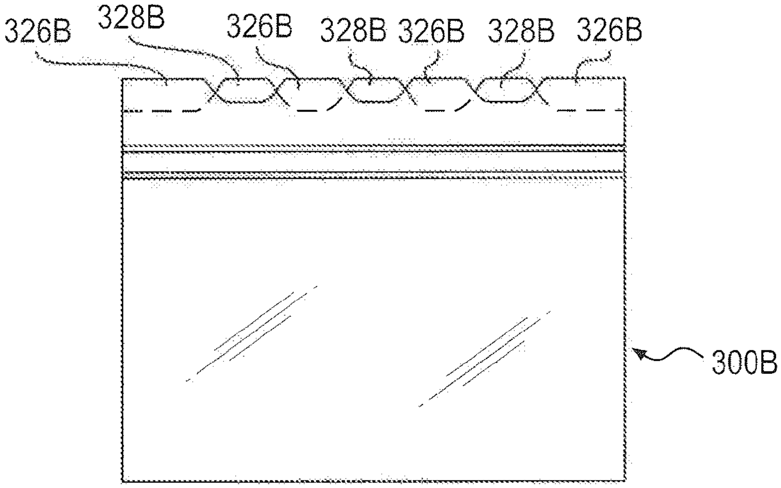
Figure 10C:
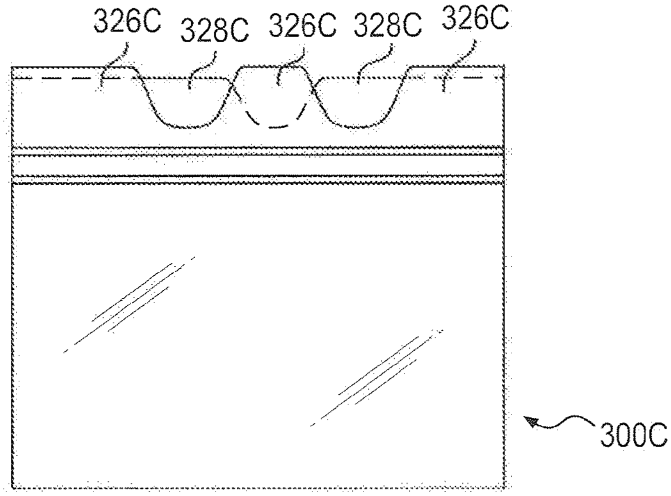

FIGS. 10A, 10B, and 10C show bags 300A, 300B, and 300C according to further embodiments of the invention. In these embodiments, the lips 326A, 326B, and 326C are at least partially offset from the lips 328A, 328B, and 328C, respectively. As shown in FIGS. 10B and 10C, multiple tabs are formed in bags 300B and 300C as a result of the offset between the lips 326B and 326C, and the lips 328B and 328C. The multiple tabs provide even further visual cues as to the location that the bags 300B and 300C can be grasped when unsealing the openings.

Figure 11:
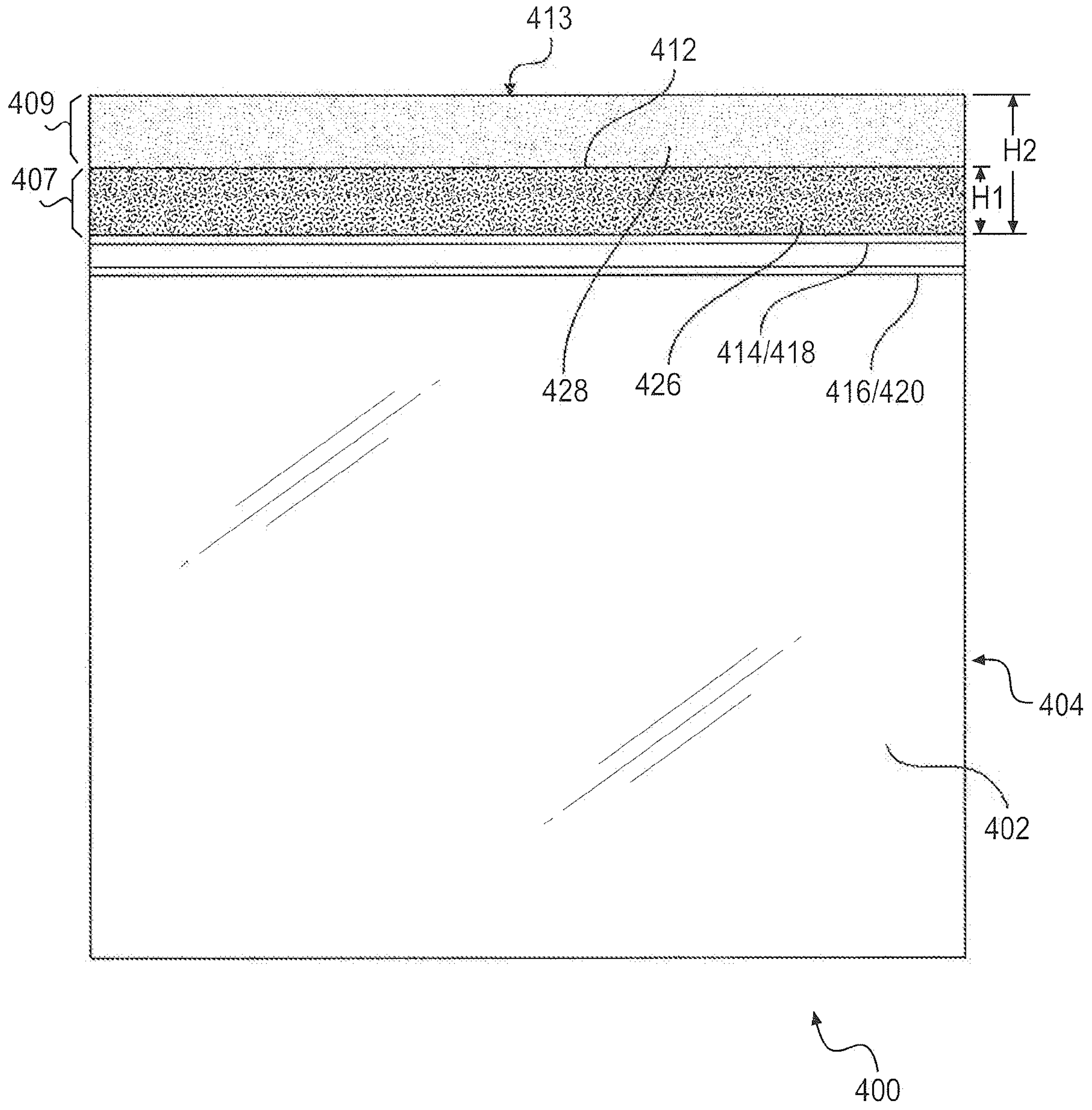
FIG. 11 is a side view of a bag with colored lips according to an embodiment of the invention.

FIG. 11 shows a bag 400 according to another embodiment of the invention. In this embodiment, the lip 426 of the first closure profile 407 extends a distance H1 from the interlocking member 414, and the lip 428 of the second closure profile extends a distance H2 from the interlocking member 418. The distance H2 is greater than the distance H1 such that throughout the length of the bag 400, the edge 413 formed by the second closure profile 428 is further from the interlocking members 414 and 418 than the edge 412 formed by the first closure profile is from the interlocking members 414 and 418.

In order to provide an aid for distinguishing between the first and second lips 426 and 428, coloring is provided to the lips 426 and 428. In effect, when the bag 400 is viewed looking at the first side surface 102 or the second side surface 104, the area where the first lip 426 overlaps the second lip 428 appears as a noticeably darker color, or as a noticeably darker shade of color, than the area of the second lip 428 that is not overlapped by the first lip 426. Thus, the user can easily distinguish the first and second lips 426 and 428, and it is easier for the user to determine where to grasp the bag 400 when unsealing the interlocking members 414, 416, 418, and 420.

As will be apparent from the discussion herein, the references to a "darker color" and "a darker shade of color" have different meanings A CIELAB color space is a common technique for quantifying colors and shades of a color. In this color space, the L* represents the lightness or darkness of a color, and a* and b* represent color-opponent dimensions, based on nonlinearly compressed CIE XYZ color space coordinates. The L*, a*, and b* values for a color of a particular sample can easily be determined by using, for example, a spectrophotometer. As used herein, when considering two color samples, a darker color sample would be one in which the a* and b* values are indicative of the darker color than the other sample, e.g., a* and b* values indicative of a blue color that is darker than the a* and b* values indicative of a yellow color. A darker shade of color, on the other hand, would be indicative of two samples having substantially the same a* and b* values, but different L* values, with the sample having the higher L* value being the lighter shade of color. In this regard, it should be noted that the term "color," as used herein, encompasses black, white, and shades of gray. It should also be noted that a substantially transparent plastic storage bag, as discussed above and as is known in the art, can be considered to have a certain "color." When referencing first and a second colors, or shades of color, herein, one of the first and second colors or shades of color may be the same as the rest of the bag, including substantially transparent portions of the bag.

It follows that the visual effects of the first and second lips 426 and 428 described herein can be achieved using different colors, wherein the a* and/or b* values of the lips 426 and 428 are different. Qualitatively, the first lip 426 might appear as a green color, while the second lip 428 appears as a red color. In such an embodiment, the L* values of the two lips 426 and 426 could be the same, or the L* values could be different. In other embodiments, the first and second lips 426 and 428 are provided as substantially the same color, i.e., have about the same a* and b* values, but have different L* values. In such a case, the first and second lips 426 and 428 are a different shade of color. In still other embodiments, the first and second lips 426 and 428 are formed in the same color and the same shade of color. Yet, due to the overlapping of the first lip 426 with a portion of the second lip 428, the overlapping area naturally appears as a darker shade of color than the portion of the second lip 428 that is not overlapped by the first lip 426, when the bag is viewed from the first side surface 402 or the second side surface 404. Such an effect can be achieved, for example, by using a larger thickness of the lips 426 and 428. In still other embodiments, the first and second lips 426 and 428 can be formed by different colors, which will thereby provide a different color in the overlapping portions of the lips 426 and 428 than in the non-overlapped portion of the second lip 428, e.g., the first lip 426 is a yellow color and the second lip 428 is a blue color such that a green color is produced in the area where the first lip 426 overlaps the second lip 428, when the bag is viewed towards the first side 402 or the second side 404.

In specific embodiments, the L* values of the two lips 426 and 428 are different by a value of about thirty. As examples, the L* value of the darker first lip 426 is about fifty to about seventy, more specifically, the L* value is about fifty-five to about sixty-five, and even more specifically, the L* value is about fifty-five to about sixty. The L* value of the lighter second lip 428 is about sixty to about eighty, more specifically, the L* value is about sixty-five to about seventy-five, and even more specifically, the L* value is about seventy to seventy-five. With all of these configurations, the first lip 426 appears substantially darker than the second lip 428. Therefore, a user can easily distinguish between the two lips 426 and 428, which, in turn, makes it easier for the user to determine where to grasp the bag 400 when unsealing the interlocking members 414, 416, 418, and 420.

The color can be formed in the lips 426 and 428 using a variety of techniques. As one example, a colorant in liquid or solid form can be mixed with the resin prior to an extrusion operation that forms the closure profiles 407 and 409 of the bag. As a similar example, the color can be introduced by adding color resin pellets or liquid color to a pellet stream where it will be homogenized throughout the plastic during the extrusion process that forms the film and/or the profiles 407 and 409 of the bag. In such an arrangement, the coloring agent can be introduced through a separate extruder added to the overall extrusion forming process, for example, by extruding a color layer on the already formed closure profiles 407 and 409. As another example, the color can be applied by painting or printing on the closure profiles 407 and 409. Those skilled in the art will recognize that a wide variety of other techniques could be used to form the colors or shades of color in the lips 426 and 428 of the bag 400.

While the bag 400 depicted in FIG. 11 is formed with the shorter first lip 426 being a darker color or a darker shade of color than the longer second lip 428, the relative coloring might be reversed, in other embodiments. That is, the shorter first lip 426 can be a lighter color or a lighter shade of color than the longer lip 428. The color contrast in such embodiments can be further emphasized by only providing the darker color or darker shade of color in the portion of the second lip 428 that is not overlapped by the first lip 426. Additionally, while the entire distances H1 and H2 between the interlocking members 414 and 418 and the edges 412 and 413 are provided with color in the embodiment depicted in FIG. 11, in other embodiments, the color need not extend the entire distances H1 and H2. Instead, the color may extend over a portion of the distances H1 and H2 in the lips 426 and 428.

In other embodiments, the color is not a solid block on the lips 426 and 428. Instead, the color may be formed, for example, in patterns or shapes, with the patterns and shapes being continuous or discontinuous. Examples of such patterns and shapes include hearts, flowers, trees, etc. Along these lines, the coloring of either the lip 426 or the lip 428 can include multiple colors. Still further, as indicated above, one of the colors or shades of colors of the first and second lips 426 and 428 can be the same as the other portions of the bag. Thus, in an embodiment, the color of the first lip 426 is the same as the color of the substantially transparent side surface 402, while the lip 428 is formed with two different colors. Those skilled in the art will appreciate the wide range of coloring options for the lips 426 and 428 of the bag 400.

The interlocking members 414, 416, 418, and 420 may also be colored, and as such, provided as the same color or different colors than the lips 426 and 428. With coloring, the interlocking members 414, 416, 418, and 420 can easily be discerned, thus making it easier for the user to seal and to unseal the bag. Therefore, by providing bag 400 with colored lips 426 and 428, as well as colored interlocking members 414, 416, 418, and 420, the user can easily identify the portions that are used to seal and to unseal the bag 400.

Figure 12:
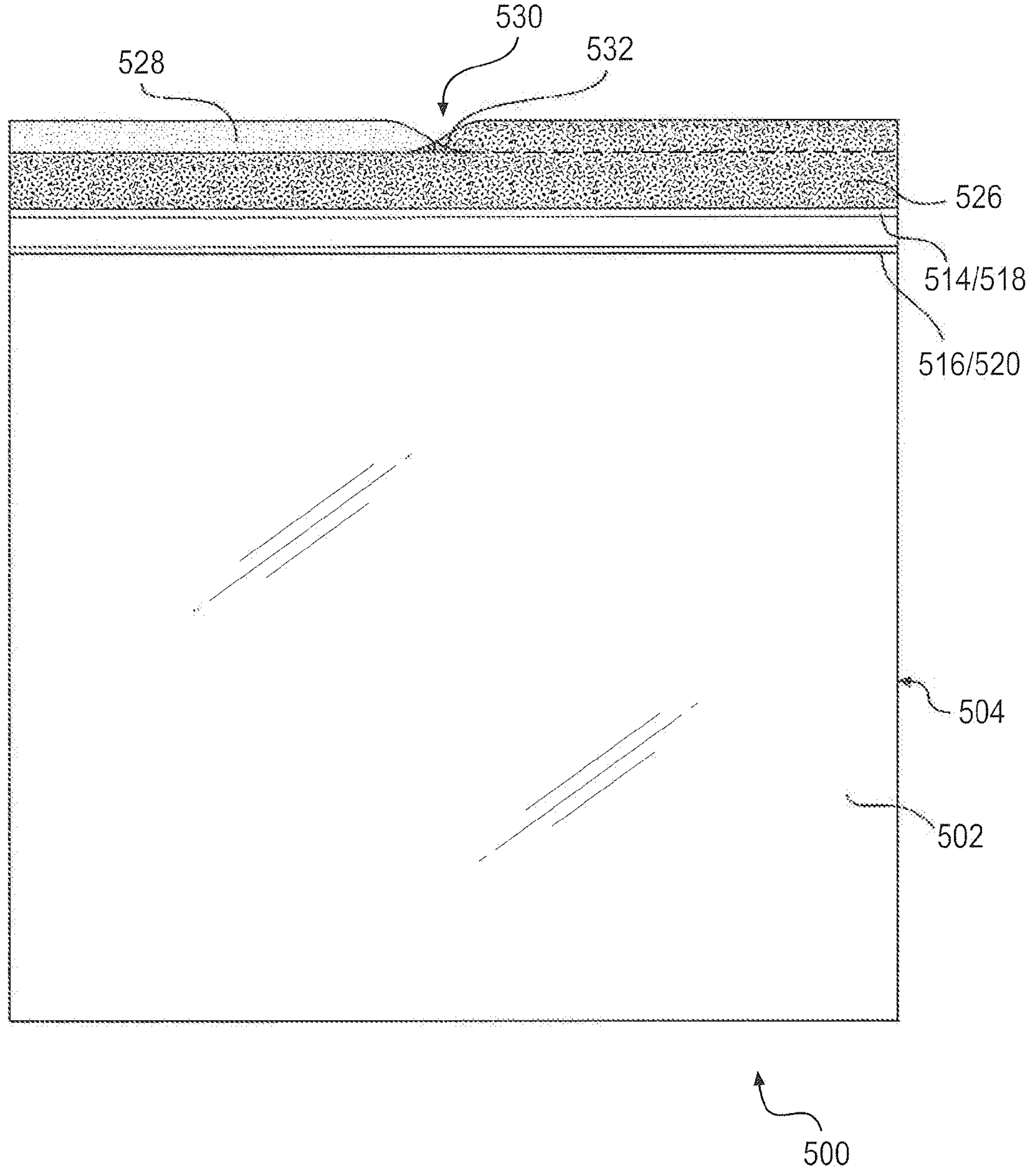
FIG. 12 is a side view of the bag shown in FIG. 1 provided with colored lips.

FIG. 12 shows a bag 500 according to yet another embodiment of the invention. The bag 500 is configured similar to the bag 100 described above, except that the lips 526 and 528 are colored. The first lip 526 is a darker color, or a darker shade of color, than the second lip 528. Thus, a user can easily distinguish between the two lips 526 and 528. Moreover, due to the overlapping of the first and second lips 526 and 528 in the region directly below the notch 530, an even darker portion 532 is visible when viewing the bag 500 towards the first or second sides 502 and 504. This provides a further visual cue that leads the user to grasp the lips 526 and 528 in the region of the bag 500 adjacent to the notch 530. As discussed above, the interlocking members 514, 516, 518, and 520 can most easily be unsealed when the bag 500 is grasped near the notch 530.

Figure 13:
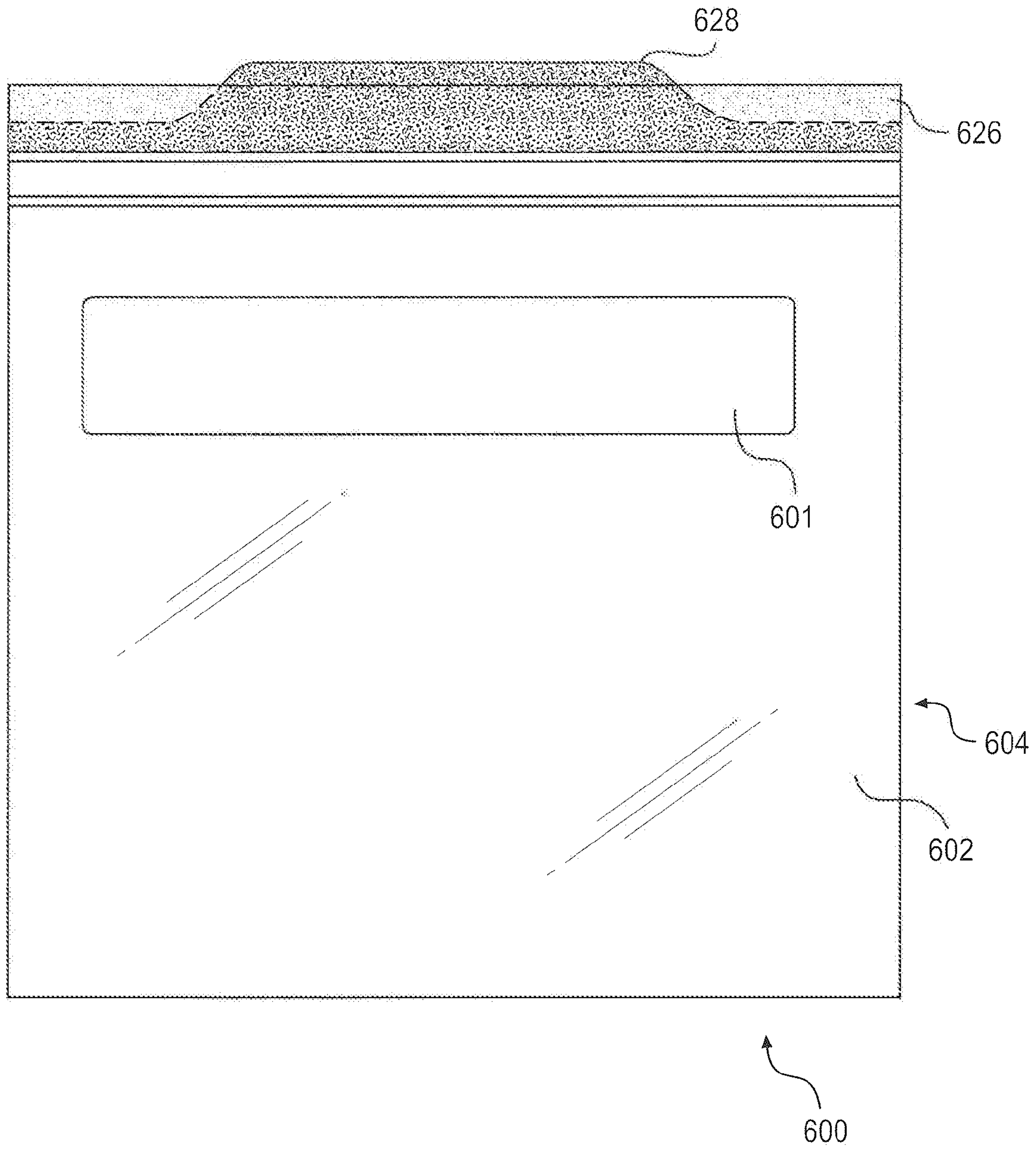
FIG. 13 is a side view of the bag shown in FIG. 6 provided with colored lips.

FIG. 13 shows a bag 600 according to another embodiment of the invention. The bag 600 is configured in the same manner as the bag 200 depicted in FIGS. 6 and 7, except that the lips 626 and 628 of bag 600 are colored. The second lip 628, which includes a portion that extends above the first lip 626, is a darker shade of color or a darker color than the first lip 626. As with the other colored lip examples discussed above, a user can easily distinguish between the two lips 626 and 628.

The coloring of the lips 426, 428, 526, 528, 626, and 628 in bags 400, 500, and 600 may also allow for the bags 400, 500, and 600 to be easily distinguished from other storage bags. That is, the coloring of the lips 426, 428, 526, 528, 626, and 628 provides a visual indication to a user of the particular bag, and such a feature may provide an express or an implicit indication of the contents of the bag. For example, blue colored lips might be used to indicate a freezer bag, magenta colored lips might be used to indicate a refrigerator bag, and green colored lips might be used to indicate a general purpose storage bag. Moreover, the colored lips 426, 428, 526, 528, 626, and 628 might allow a particular bag to stand out amongst other bags, such as a magenta bag amongst green bags. Of course, as the coloring may only be formed in the lips 426, 428, 526, 528, 626, and

628, the first and second side surfaces 400, 402, 500, 502, 600, and 602 of the bags 400, 500, and 600 may still be made transparent or substantially transparent. Thus, while the bags 400, 500, and 600 are imparted with an indicative color by the lips 426, 428, 526, 528, 626, and 628, the contents of the bags 400, 500, and 600 can nevertheless still be easily seen.

In order to further distinguish the bag 600 from other bags, the bag 600 may include an area 601 that allows writing to be easily imparted on the bag 600, i.e., the area 601 forms a label for the bag 600. Often, plastic bags have a label that is printed on a surface. Typically, such a label is printed on the bag with ink applied, for example, by a flexographic printer. The area 601 of the bag 600 can be such an ink label, in some embodiments of the invention.

In other embodiments, however, the area 601 is not formed with ink, but rather, is formed as an etched portion of the surface of the bag. The etched area can be formed using a variety of techniques. As one example, the area 601 can be formed by sandblasting. As another example, the area 601 can be formed by an ultrasonic scuffing process, wherein a roughened or an embossed surface of a vibrating horn or anvil is brought into contact with a surface of the bag 600. It has been found that performing such etching techniques on a surface of a bag constructed from plastic materials, such as the plastics described above, imparts an etched area that will readily receive writing from a standard ink pen. The etching techniques for forming area 601 are advantageous over ink printing techniques for forming area 601, inasmuch as etching may be less costly than the ink used to form the area 601. Additionally, forming the area 601 by etching provides for a more environmentally friendly bag 600 by eliminating the use of the printing ink. It should be noted that regardless of the techniques used to form the area 601, the area 601 can be formed on any surface of the bag 600, and, further, the area 601 can be formed in any shape.

Figure 14:
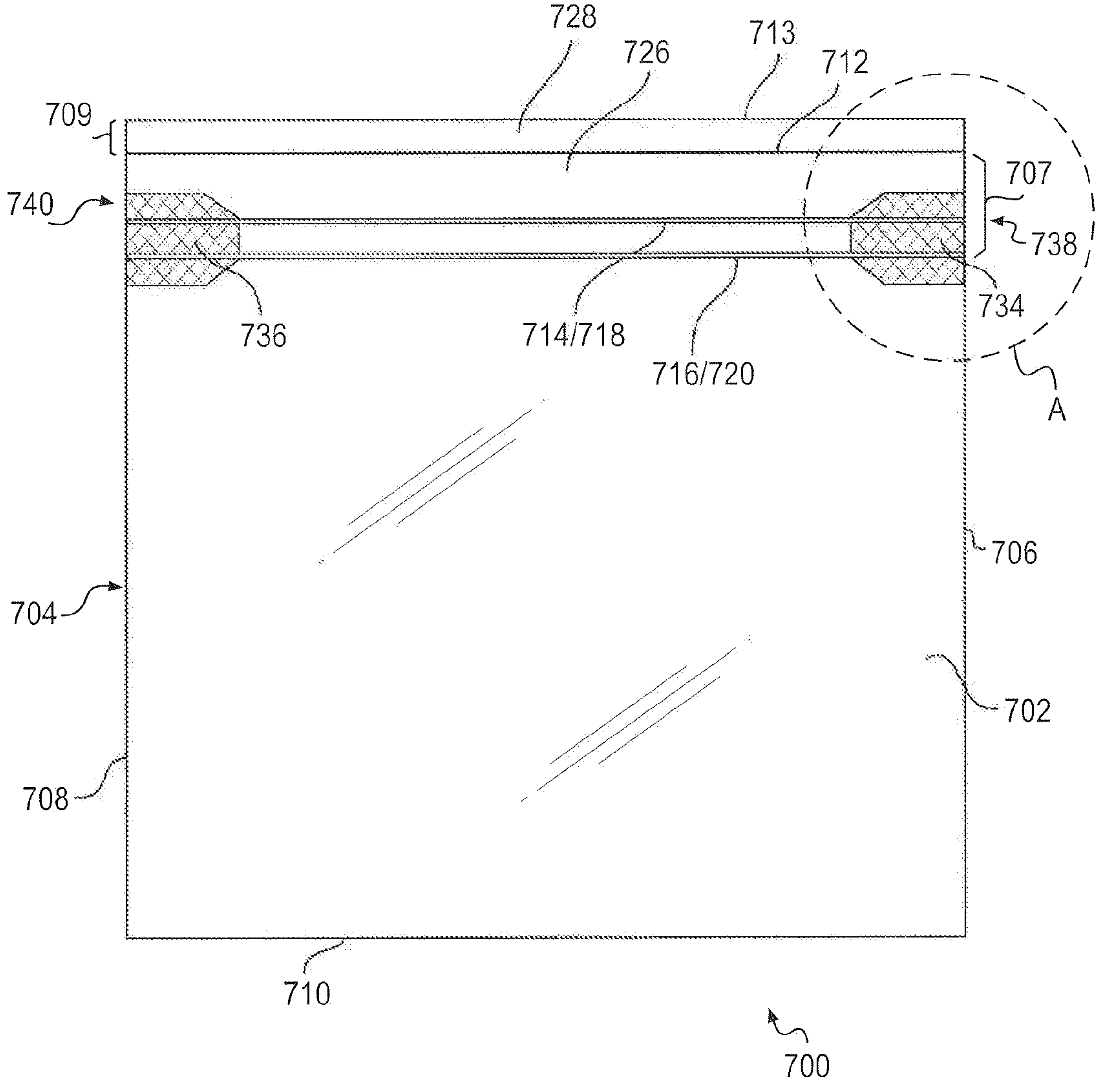
FIG. 14 is a side view of a bag according to another embodiment of the invention.
Figure 15:
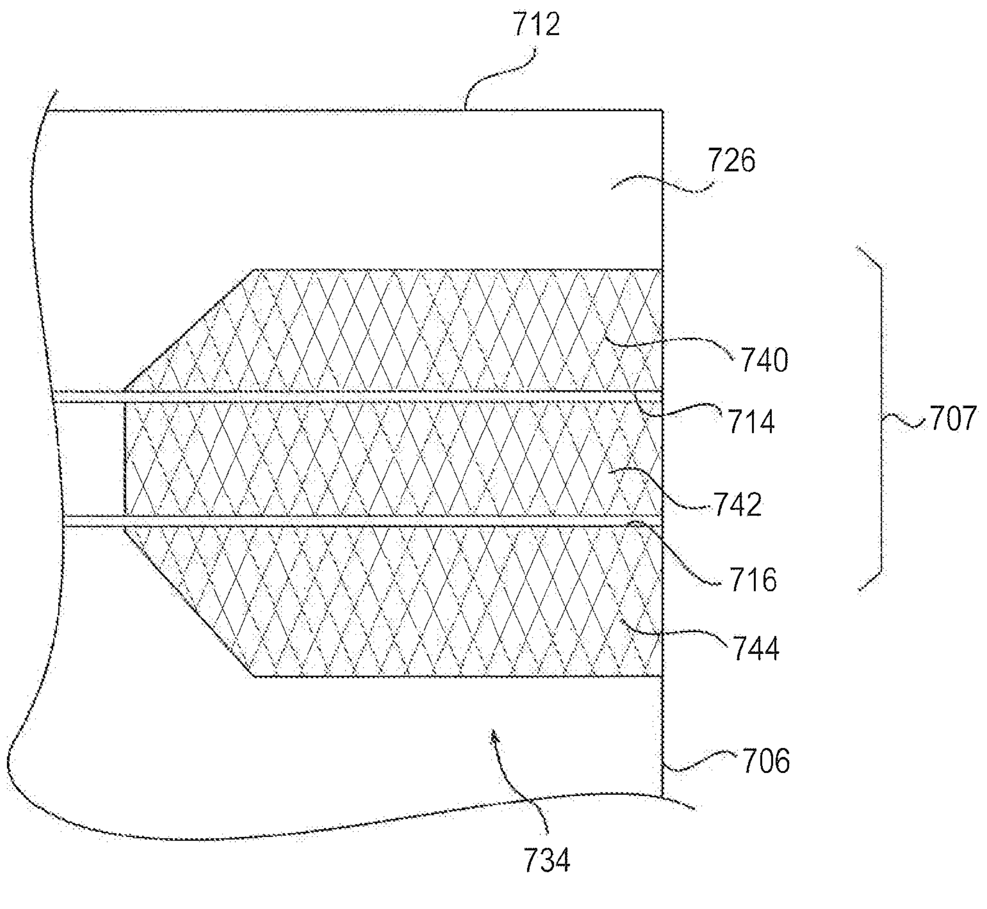
FIG. 15 is a detailed view of the Section A shown in FIG. 14.
Figure 16:
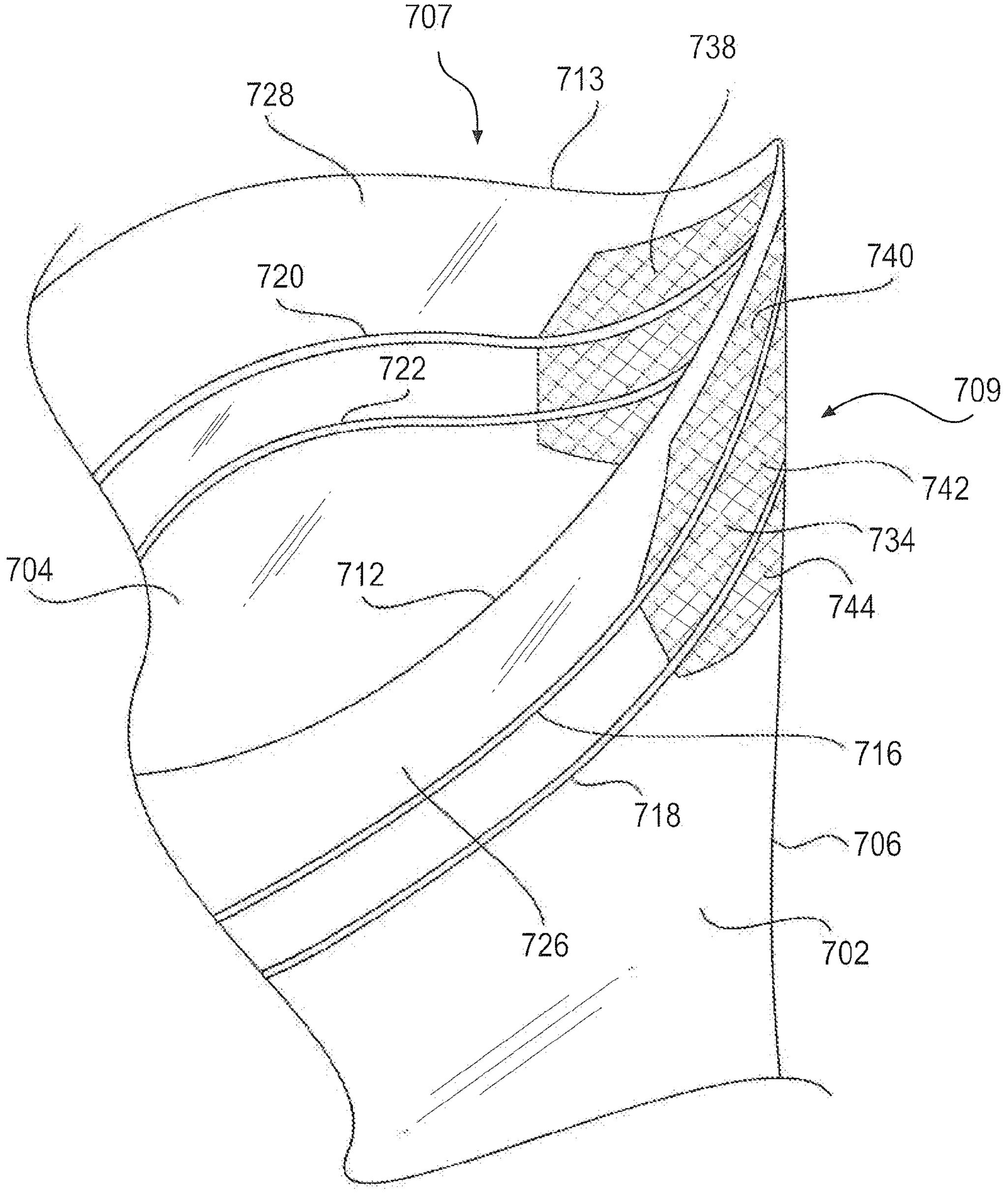
FIG. 16 is a view of the top end of the bag shown in FIG. 14.

FIGS. 14 to 16 show a bag 700 according to another embodiment of the invention. The bag 700 is generally configured similarly to the bags described above, inasmuch as the bag 700 includes first and second side surfaces 702 and 704 that are connected at edges 706, 708, and 710. The bag 700 also includes first and second closure profiles 707 and 709, with the closure profiles 707 and 709 including interlocking members 714, 716, 718, and 720. The first and second closure profiles 707 and 709 also include first and second lips 726 and 728 that define edges 712 and 713. The first and second lips 726 and 728 are offset in a manner similar to the lips 412 and 413 of the bag 400 described above.

In bag 700, the first and second closure profiles 707 and 709 include textured areas 734, 736, 738, and 740 that are positioned adjacent to the edges 706 and 708, and adjacent to the interlocking members 714, 716, 718, and 720. The textured areas 734, 736, 738, and 740 provide a significantly different texture compared to the other surfaces of the bag 700, such that the textured areas 734, 736, 738, and 740 are visually distinguishable from the areas of the closure profiles 707 and 709 that are adjacent to the textured areas 734, 736, 738, and 740. The textured areas 734 and 736, however, extend over only a portion of the length of the closure profiles 707 and 709, and in particular, at areas adjacent to the ends of the interlocking members 714, 716, 718, and 720. That is, the first and second closure profiles 707 and 709 include the textured areas 734, 736, 738, and 740 adjacent to portions of the interlocking members 714, 716, 718, and 720, but the closure profiles 707 and 709 are formed with untextured areas adjacent to the majority of the lengths of the interlocking members 714, 716, 718, and 720. Note, the term "untextured," as used herein, denotes a relatively smooth surface as is commonly found in the art.

FIGS. 15 and 16 show details of the textured area 734 of the bag 700. The textured area 734 includes a section 740 that is positioned above the interlocking member 714, a section 742 that is positioned between the interlocking members 714 and 716, and a section 744 that is positioned below the interlocking member 716. The other textured areas 736, 738, and 740 of the bag 700 also include three sections positioned in a similar manner with respect to interlocking members 714 and 716 or interlocking members 718 and 720.

It has been found that zipper-type closure structures, such as the closure structures formed by interlocking members 714, 716, 718, and 720, are more easily sealed, and more often completely sealed, if the user starts the sealing operation at the ends of the interlocking members 714, 716, 718, and 720. The textured areas 734, 736, 738, and 740 provide a visual cue for a user to grasp the closure profiles 707 and 709 at positions adjacent to the ends of the interlocking member 714, 716, 718, and 720 when beginning the process of sealing the bag. Thus, the user is more apt to properly and to completely seal the bag 700 with the guidance provided by the textured areas 734, 736, 738, and 740.

As shown in FIG. 16, the textured areas 734 and 736 extend over portions of the lengths of the interlocking members 716, 718, 720, and 722 that can be either interlocked or unlocked from each other. In order to facilitate interlocking, however, the textured areas 734 and 736 are not substantially formed into the interlocking members 716, 718, 720, and 722 themselves. That is, the formation of the textured areas 734 and 736 does not substantially affect the shapes of the interlocking members 716, 718, 720, and 722, such that the interlocking members 716, 718, 720, and 722 can still be effectively interlocked, and, thus, seal the opening of the bag 700.

The textured areas 734, 736, 738, and 740 may be formed by a variety of techniques and processes. As one example, the textured areas 734, 736, 738, and 740 can be formed by embossing the closure profiles 707 and 709 with a die press. As another example, the textured areas 734, 736, 738, and 740 can be formed by ultrasonic embossing. As will be appreciated by those skilled in the art, die or ultrasonic embossing techniques will allow for the formation of the textured areas 734, 736, 738, and 740 in the specific sections 740, 742, and 744, without also embossing on the interlocking members 714, 716, 718, and 720, i.e., without crushing or otherwise deforming the interlocking members 714, 716, 718, and 720. Of course, those skilled in the art will recognize that there is a variety of other techniques with which the textured areas 734, 736, 738, and 740 can be formed. For example, as an alternative to embossing, the textured areas 734, 736, 738, and 740 can be formed by a micromolding operation on the closure profiles 707 and 709.

It should be noted that, although the textured areas 734, 736, 738, and 740 in bag 700 are formed in the sections above, in between, and below the interlocking members 714, 716, 718, and 720, in other embodiments, the textured areas 734, 736, 738, and 740 can be formed in only one or two of these sections. For example, the textured areas 734, 736, 738, and 740 may only be formed in the area between the interlocking members 714, 716, 718, and 720, but not above or below the interlocking members 714, 716, 718, and 720. Indeed, the textured areas 734, 736, 738, and 740 could be formed in only one section adjacent to the interlocking members 714, 716, 718, and 720. Moreover, in still other embodiments, the textured areas 734, 736, 738, and 740 may only be formed on one side of the bag 700 or only at one end of the interlocking members 714, 716, 718, and 720. For example, the textured area 734 may alone be formed in an embodiment, with the other textured areas 736, 738, and 740 being omitted.

Figure 17:
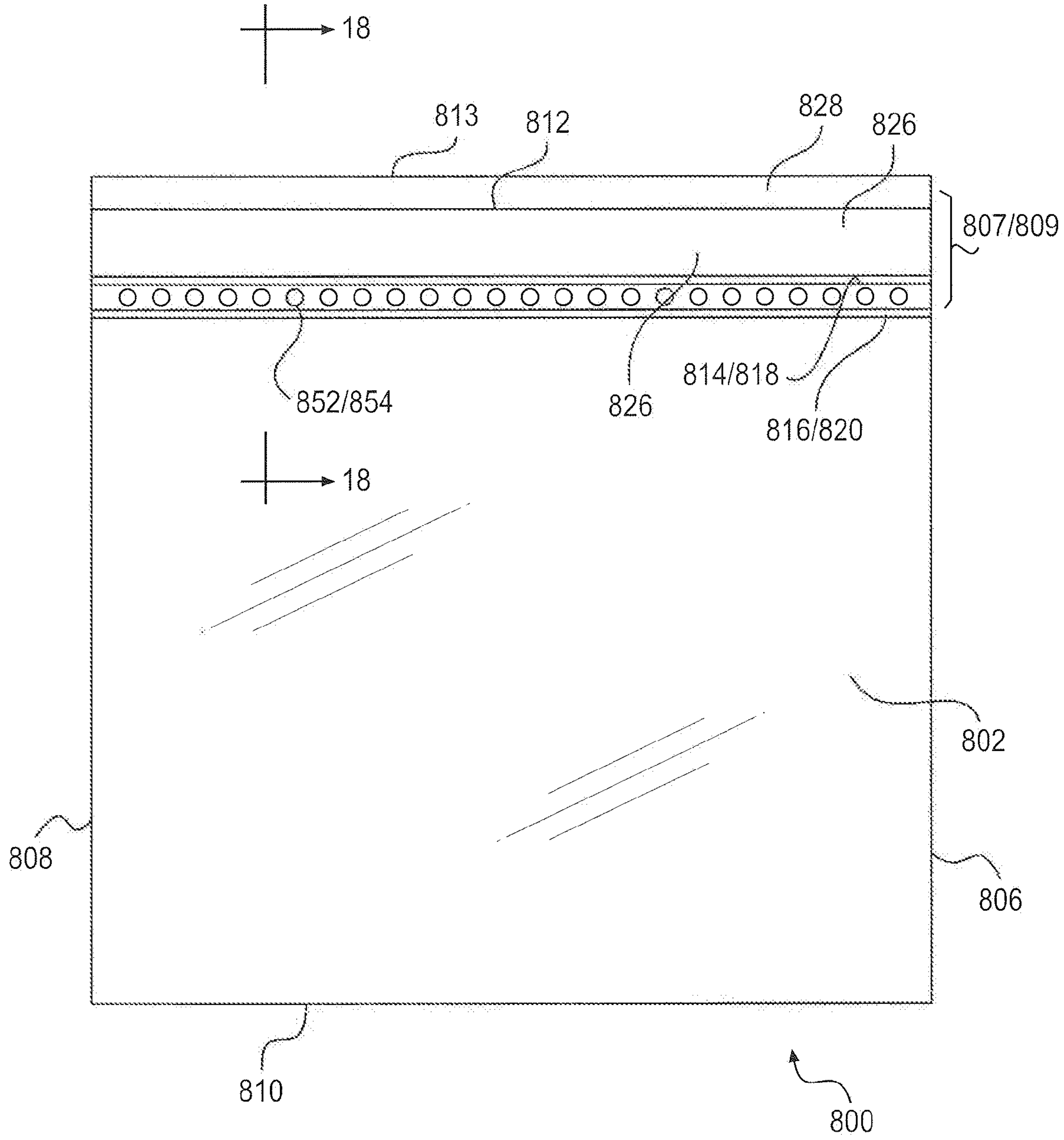
FIG. 17 is a side view of a bag according to a further embodiment of the invention.
Figure 18:
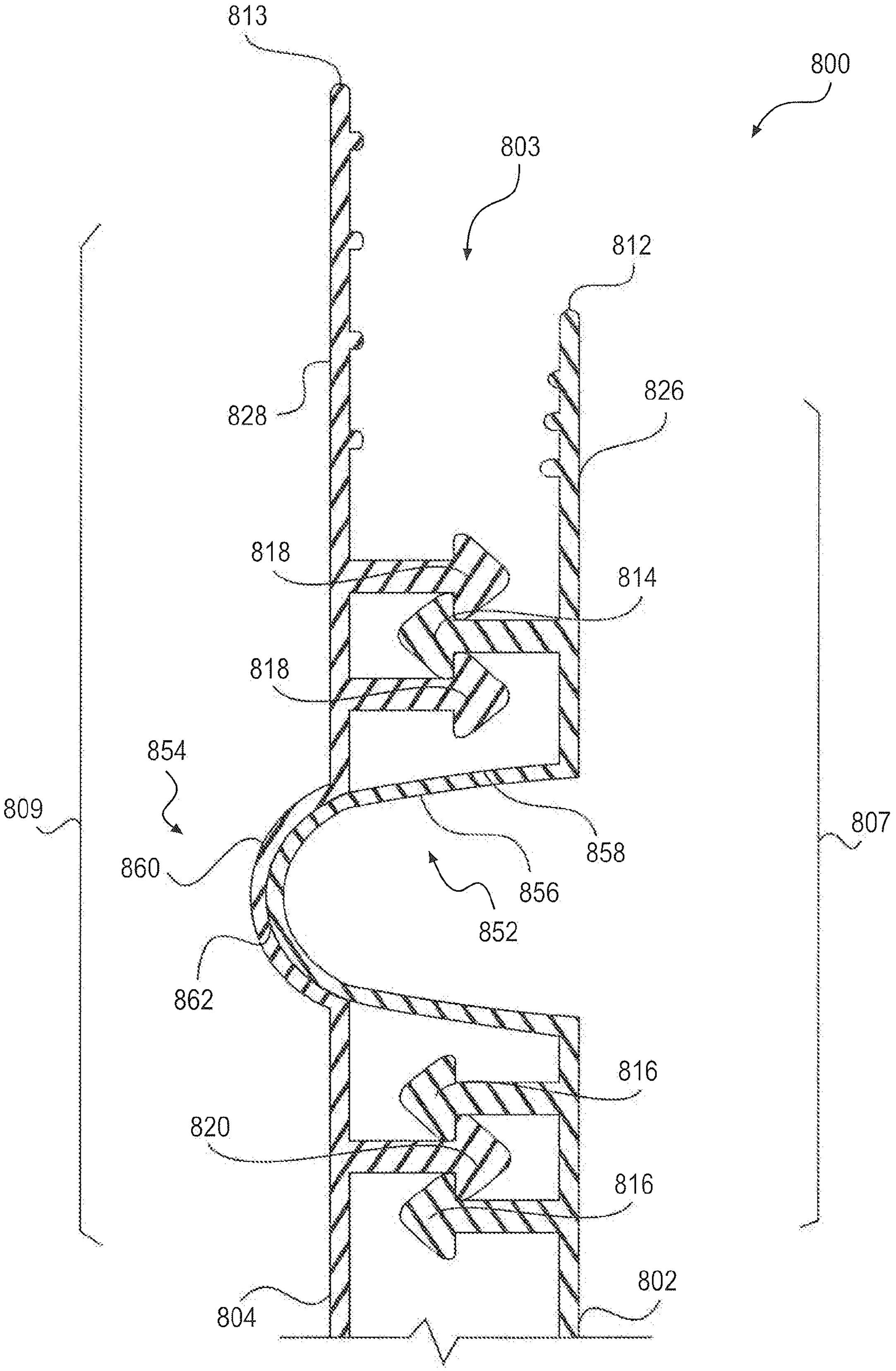
FIG. 18 is a cross-sectional view of the top end of the bag shown in FIG. 17 as taken along line 18-18.

A bag 800 according to a further embodiment of the invention is shown in FIGS. 17 and 18. The bag 800 includes a first side surface 802 and a second side surface 804 that are connected at edges 806, 808, and 810. The bag 800 also includes first and second closure profiles 807 and 809 that extend adjacent to an opening 803 to the interior of the bag 800. The closure profiles 807 and 809 include interlocking members 814, 816, 818, and 820. The interlocking members 814, 816, 818, and 820 are configured to seal the opening of the bag 800 in the same manner as the interlocking members in the embodiments described above. The closure profiles 807 and 809 also include first and second lips 826 and 828 that define the edges 812 and 813 of the bag 800.

The first and second closure profiles 807 and 809 also include a plurality of dimples 852 and 854. As shown in FIG. 18, the dimples 852 in the first closure profile 807 are formed as concave surfaces 856 on the outside of the first closure profile 807, and as convex surfaces 858 on the side of the first closure profile 807 that faces the interior of the bag 800. On the other hand, the dimples 854 in the second closure profile 809 are formed as convex surfaces 860 on the outside surface of the second closure profile 809, and as concave surfaces 862 on the surface of the second closure profile 809 that faces the interior of the bag 800.

The dimples 852 of the first closure profile 807 are positioned and configured to engage the oppositely positioned dimples 854 of the second closure profile 809. More specifically, the convex surfaces 858 of the dimples 852 can be received to the concave surfaces 862 of the dimples 854 when the interlocking members 814, 816, 818, and 820 are brought together to seal the opening 803 of the bag 800. As such, the dimples 807 and 809 provide an alignment feature for the closure profiles 807 and 809. Moreover, the alignment and engaging of the dimples 807 and 809 provides a user with both a visual indication and tactile sensation that inform the user that the interlocking members 814, 816, 818, and 820 are engaging, when the user is sealing the bag 800. That is, the user visually identifies the dimples 852 and 854, and feels the convex surfaces 858 of the dimples 852 engaging the concave surfaces 862 of the dimples 854 as he or she runs his or her fingers along the interlocking members 814, 816, 818, and 820 to seal the bag 800.

It should be noted that, in addition to the configuration of concave and convex surfaces 856, 858, 860, and 862 for the dimples 852 and 854 shown in FIG. 17, the closure profiles 807 and 809 could also include dimples that have a reverse configuration from those shown in FIG. 17. That is, the dimples 852 on the first closure profile 807 could be formed with a convex surface on the outside of the first closure profile 807 and a concave surface on the side of the first closure profile 807 that faces the interior of the bag 800. These "reversed" dimples would correspond to dimples on the second closure profile 809 that have a concave surface on the outside of the second closure profile 809 and a convex surface on the surface of the second closure profile 809 that faces the interior of the bag 800. Indeed, embodiments of the bag 800 could include both the dimple configuration shown in FIG. 18, as well as the reversed dimple configuration, as long as the types of dimples shown in FIG. 18 are aligned with each other and the reversed dimples are aligned with each other.

In still other embodiments, the dimples 852 and 854 can be made flexible such that the concave and convex surfaces of the dimples 852 and 854 can change shape when pressed upon by a user. For example, when the user presses against the convex surfaces 860 of the dimples 854, the convex surfaces 860 may be flattened towards the closure profile 809. Additionally, the dimples 854 can be configured such that the convex surfaces 860 become concave relative to the outside surface of the closure profile 809, and the concave surfaces 860 become convex relative to the surface of the closure profile 809 that faces the interior of the bag 800, i.e., reversed from the configuration shown in FIG. 18. The dimples 852 can also be made flexible, and as such, in some embodiments, the deformation of the dimples 852 operates in conjunction with the deformation of the dimples 854. For example, when the concave surfaces 862 of the dimples 854 might be made to invert to a convex surface while the corresponding convex surfaces 858 of the dimples 852 invert to concave surfaces.

It should be noted that the dimples 852 and 854 are a significantly different type of structure than the interlocking members 814, 816, 818, and 820 inasmuch as the dimples 852 and 854 do not include an interlocking feature that significantly aids in sealing the opening 803 of the bag 800. Instead, the dimples 852 and 854 merely fit together. Because the dimples 852 and 854 more easily slide together than the interlocking members 814, 816, 818, and 820, the dimples 852 and 854 provide an effective guide for aligning the closure profiles 807 and 809 in a manner that allows the interlocking members 814, 816, 818, and 820 to become interlocked.

The dimples 852 and 854 can be particularly effective in combination with a feature that provides audible feedback indicating that the interlocking members 852 and 854 have been engaged. As discussed above, interlocking members may be configured to provide an audible sound and/or a tactile sensation when engaging with each other. In addition to, or in alternative to, the interlocking members 814, 816, 818, and 820 being provided with a sound producing feature, the dimples 852 and 854 could be configured to provide a sound when becoming aligned, such as a "popping" sound when the dimples 852 and 854 are brought together. That is, the nesting of the dimples 852 and 854 can be made to amplify other sounds indicating that the interlocking members 814, 816, 818, and 820 are engaging. Regardless of the source of the sound, the provision of a sound in combination with the feel that the dimples 852 and 854 provide when becoming aligned provides the user with a vivid indication that the interlocking members 814, 816, 818, and 820 are interlocking together and the bag 800 is being sealed. The indication to the user may be even more effective if the sounds correspond to the dimples 852 and 854 becoming aligned. That is, a user is provided with excellent tactile and audio feedback when the bag 800 is configured to produce a sound at about the same time that the dimples 852 and 854 are nested together.

As will be appreciated by those skilled in the art, the dimples 852 and 854 can be formed in the closure profiles 807 and 809 using a variety of techniques. As one example, the dimples 852 and 854 could be formed using a mechanical operation, such as a pressing operation with a die. In such a pressing operation, heat could also be applied to the closure profiles 807 and 809 in order to facilitate the deformation in the closure profiles 807 and 809 that forms the dimples 852 and 854. Alternatively, the dimples 852 and 854 could be formed using an ultrasonic forming operation. As still other alternatives, the dimples 852 and 854 could be formed by a micromolding process, or as part of a vacuum extrusion operation in the process of forming the closure profiles 807 and 809. With all of these techniques, the dimples 852 and 854 are formed in a manner to prevent rupturing or weakening of the closure profiles 807 and 809.

In the bag 800 depicted in FIGS. 17 and 18, the dimples 852 and 854 are formed with substantially spherical sections that have substantially circular cross sections. In particular embodiments, the dimples 852 and 854 have a diameter of about 0.125 in. (0.3175 cm). The substantially spherical dimples 852 and 854 are uniformly provided throughout the lengths of the closures profiles 807 and 809. In some embodiments, the dimples 852 on the first closure profile 807 are spaced from each other by about 0.0625 in. (0.1588 cm) to about 0.75 in. (1.91 cm), or more specifically, the dimples 852 are spaced from each other by about 0.125 in. (0.3175 cm) to about 0.5 in. (1.27 cm), and even more specifically, the dimples 852 are spaced from each other by about 0.25 in. (0.635 cm) to about 0.375 in. (0.9525 cm). The dimples 854 on the second closure profile 809 have a similar spacing. The dimples 852 and 854 have a depth of about 5 mils to about 40 mils (0.127 to 1.02 mm), or more specifically, about 10 mils to about 30 mils (0.254 to 0.762 mm), or even more specifically, about 15 mils to about 25 mils (0.381 to 0.635 mm). In a particular embodiment, the dimples 852 and 853 have a depth of about 20 mils (0.51 mm). Of course, one of ordinary skill in the art will recognize that these dimples could be changed if so desired.

Figure 19:
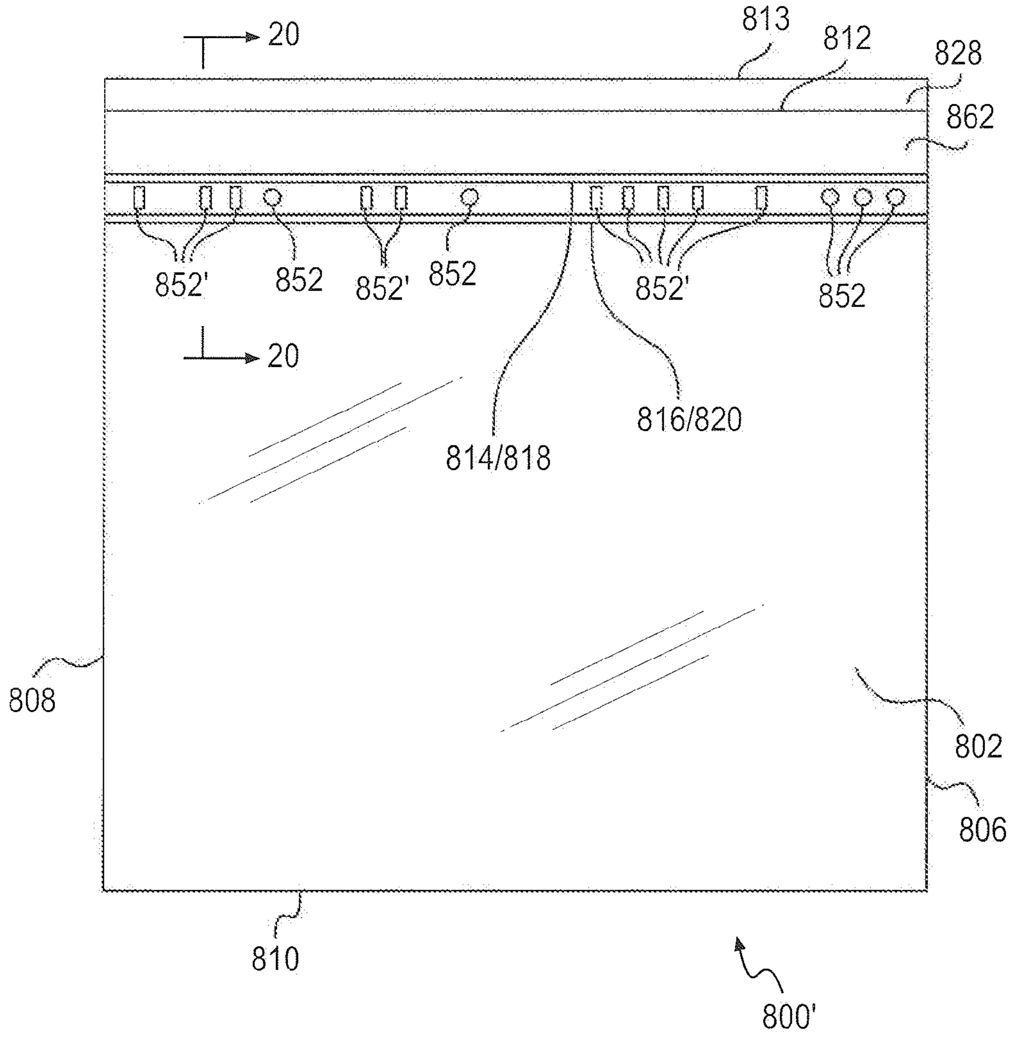
FIG. 19 is a side view of a bag according to a further embodiment of the invention.
Figure 20:
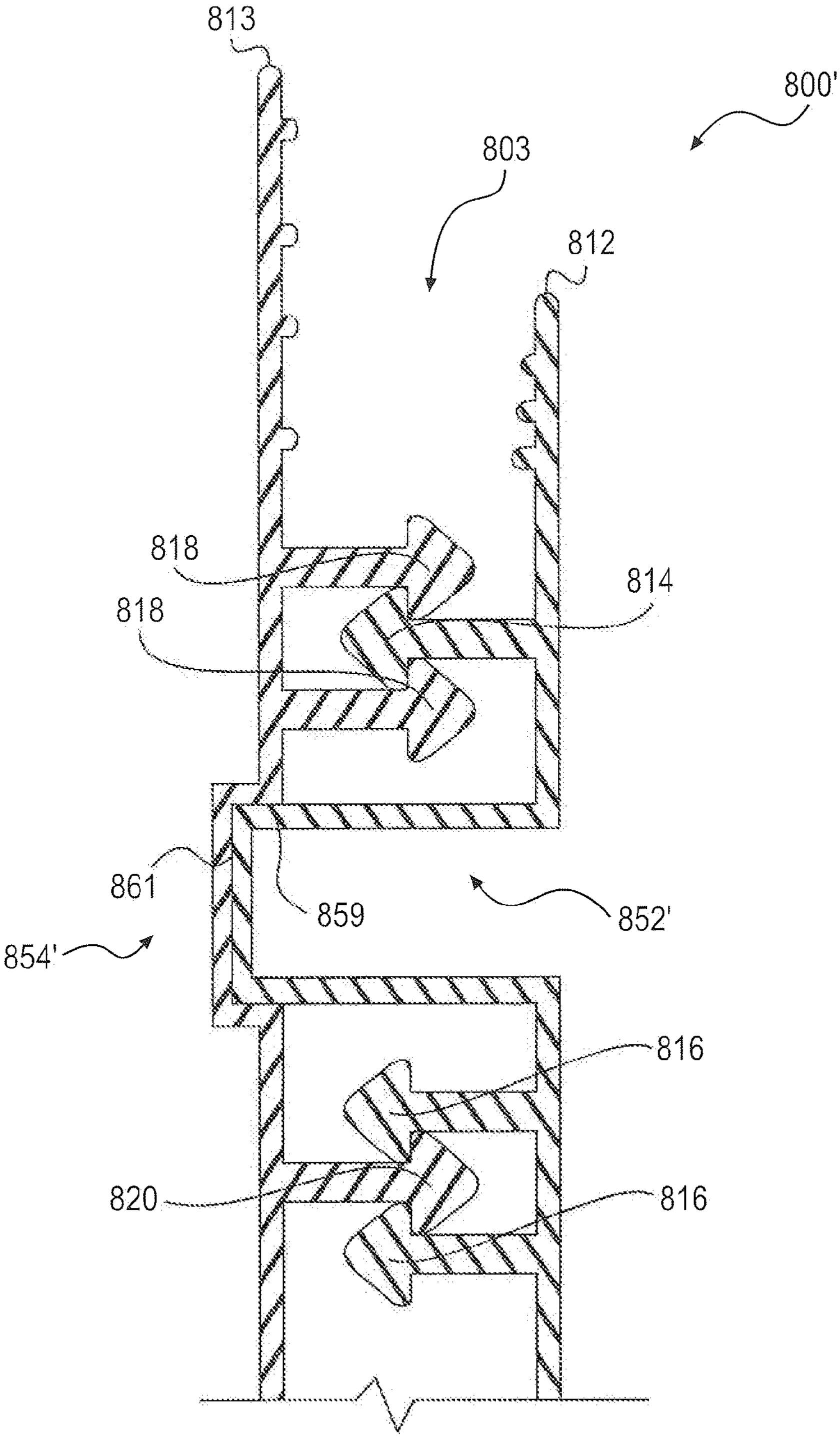
FIG. 20 is a cross-sectional view of the top end of the bag shown in FIG. 19 as taken along line 20-20.

While the dimples 852 and 854 are substantially spherical sections with substantially circular cross sections, and while the dimples 852 and 854 in FIG. 17 are evenly spaced along the closure profiles 807 and 809, there are numerous alternative shapes and configurations for the dimples 852 and 854. Two such shapes and configurations are exemplified in an embodiment depicted in FIGS. 19 and 20. In this embodiment, the dimples 852, 852', 854, and 854' are provided at irregular points along the closure profiles 807 and 809. While the dimples 852 and 854 are shaped as described above, the dimples 852' and 854' have a rectangular cross section, with the dimples 852' forming a ridge 859 that is received by a groove 854' formed by the dimples 854'. Besides the shapes and configurations shown in FIGS. 17 to 20, those skilled in the art will recognize that the dimples 852, 852', 854, and 854' could be formed with a wide variety of alternative shapes, such as, for example, dimples having a cross section with the shape of ovals, triangles, X-shapes, S-shapes, stars, hearts, arrows, Christmas trees, etc.

In the embodiments depicted in FIGS. 17 to 20, the dimples 852, 852', 854, and 854' are provided between the interlocking members 814, 816, 818, and 820. In other embodiments, however, the dimples 852, 852', 854, and 854'can be provided in different positions, such as above the interlocking members 814 and 818, or below the interlocking members 816 and 820. Moreover, the dimples 852, 852', 854, and 854' could be provided in two different areas of the closure profiles 807 and 809, such as both above interlocking members 814 and 818 and below the interlocking member 816 and 820. Along these lines, as discussed above, embodiments of the bag 800 may only include one pair of interlocking members on the closure profiles 807 and 809. In such embodiments, the dimples 852 and 854 may be placed above or below the interlocking members.

Figure 21:
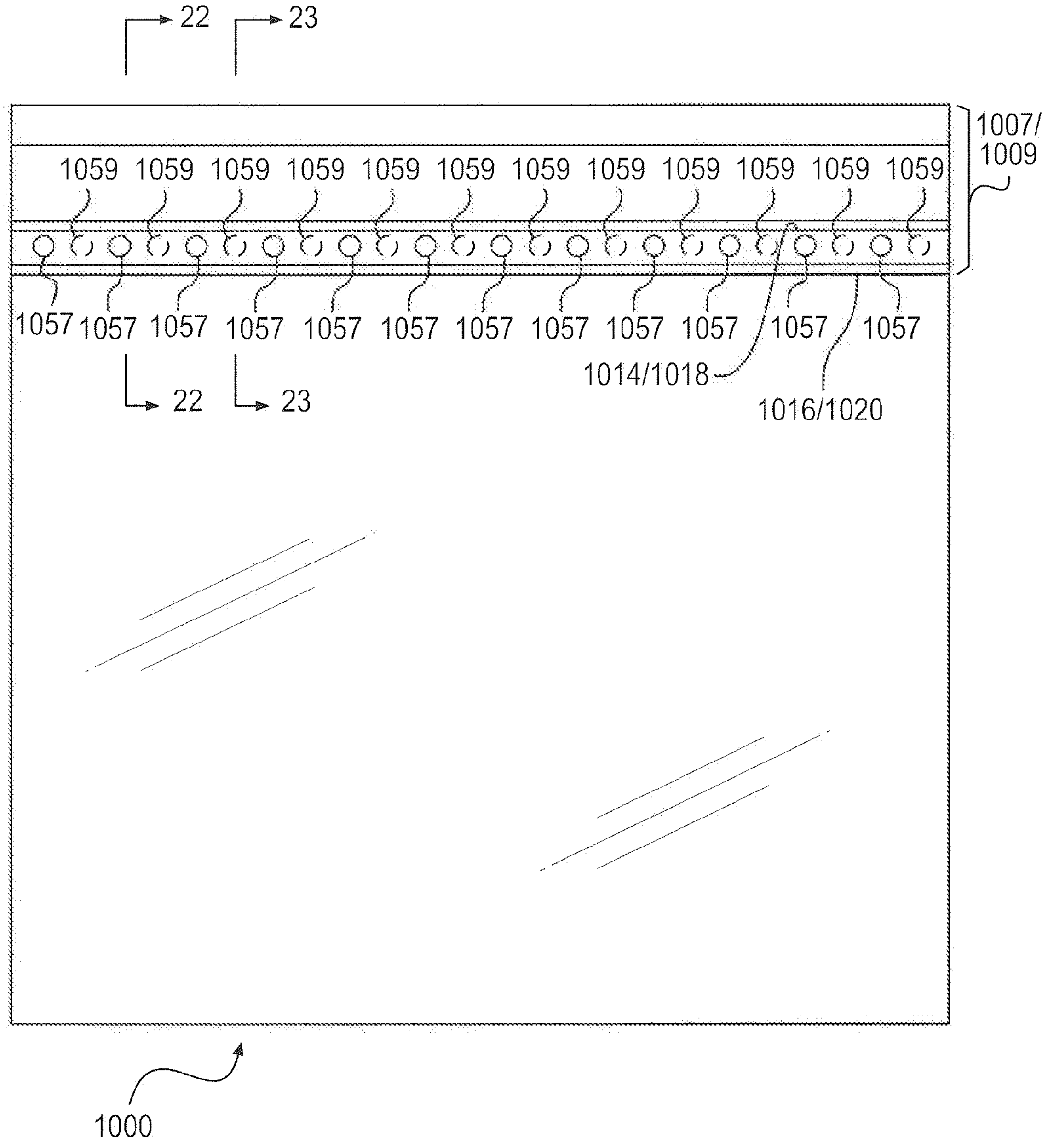
FIG. 21 is a side view of a bag according to another embodiment of the invention.
Figure 22:
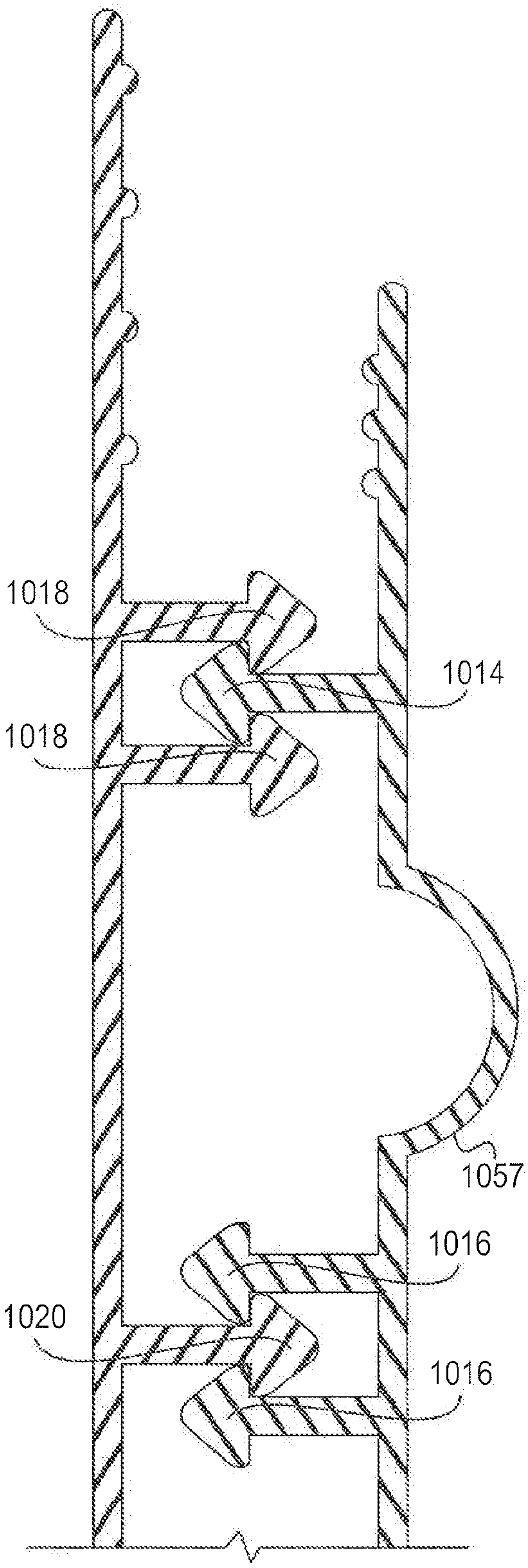
FIG. 22 is a cross-sectional view of the top end of the bag shown in FIG. 21 as taken along line 22-22.
Figure 23:
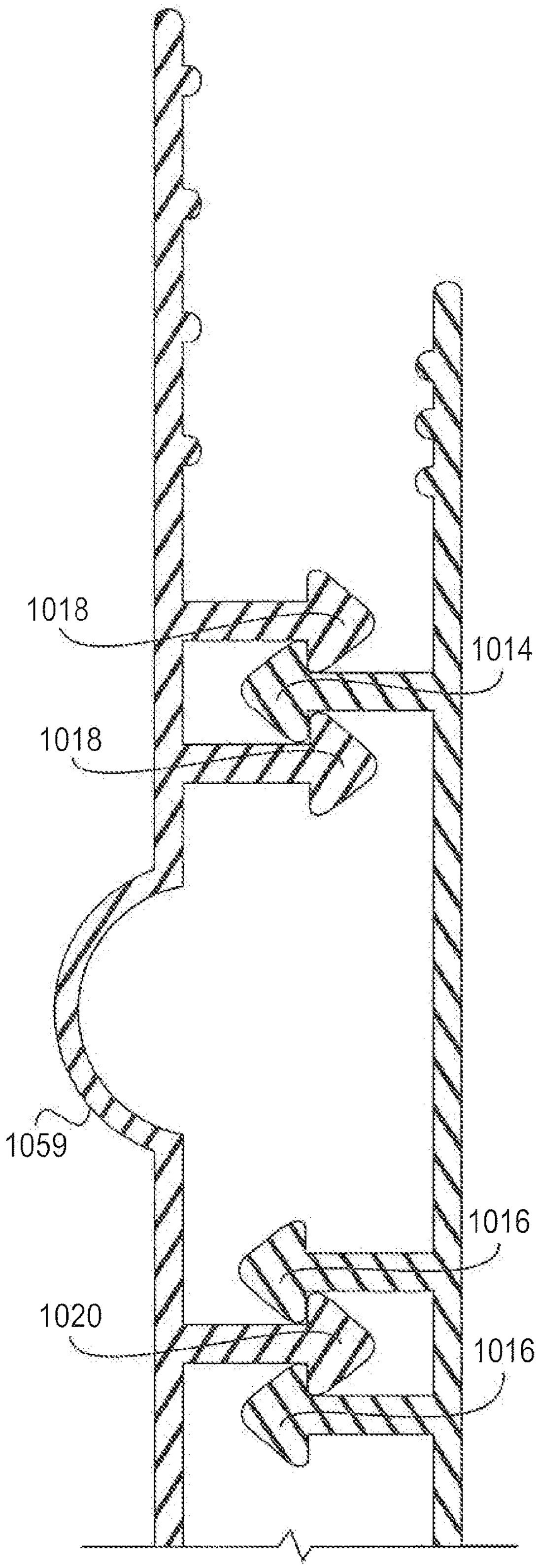
FIG. 23 is a cross-sectional view of the top end of the bag shown in FIG. 21 as taken along line 23-23.

FIGS. 21 to 23 show another embodiment of a bag 1000 that includes dimples 1052 and 1054. In this embodiment, the dimples 1052 on the first closure profile 1007 are offset from the dimples 1054 on the second closure profile 1009. As shown in FIGS. 22 and 23, the dimples 1052 are formed as a convex surface on the outside surface of the first closure profile 1007, and the dimples 1054 are formed as a convex surface on the outside surface of the second closure profile 1009. In other embodiments, however, one or both of the dimples 1052 and 1054 could be formed as concave surfaces on their respective closure profiles 1007 and 1009. The dimples 1052 and 1054 can be formed using the techniques described above. As a specific example, the dimples 1052 can be formed by embossing the closure profile 1007 between a pair of rollers, and the dimples 1054 can be formed by embossing the closure profile 1009 between another pair of rollers. With such a process, the closures profiles 1007 and 1009 are brought together in the final bag structure 1000 after the dimples 1052 and 1054 are separately formed with the pairs of rollers.

Unlike in the embodiments described above, the dimples 1052 do not nest with the dimples 1054, and as such, the dimples 1052 and 1054 do not provide a substantial guide for aligning the closure profiles 1007 and 1009. Nevertheless, the dimples 1052 and 1054 advantageously provide both a visual cue and tactile feedback that indicate to the user where to place his or her fingers when sealing the interlocking members 1014, 1016, 1018, and 1020. The user, therefore, is more assured that the bag 1000 is being sealed.

While particular features of our storage bag have been described above in different embodiments above, as will be readily apparent to those skilled in the art, many of the features of the different embodiments may be combined in different embodiments. For example, the dimple features described in conjunction with bag 800 could be provided with the different lip configurations of bags 100, 100', 200, and 300. Additionally, or alternatively, the textured areas described in conjunction with bag 700 could be used with the bags 100, 100', 200, and 300. Further, colored lips as described in conjunction with bags 400, 500, and 600 could be provided with any embodiment of our storage bag. Similarly, the label area 601 shown on bag 600 could be provided on any embodiment of our storage bag. Further, the gripping ridges 122, 123, 124, and 125 and/or texture 127 described above in conjunction with bags 100 and 100' could be provided to any embodiment of our bag. And, as described above, the gripping ridges 122, 123, 124, and 125, and texture 127, could be provided on inside surfaces of the lips of the bags, outside surfaces of the lips, or both the inside and outside surfaces of the lips.

Figure 24:
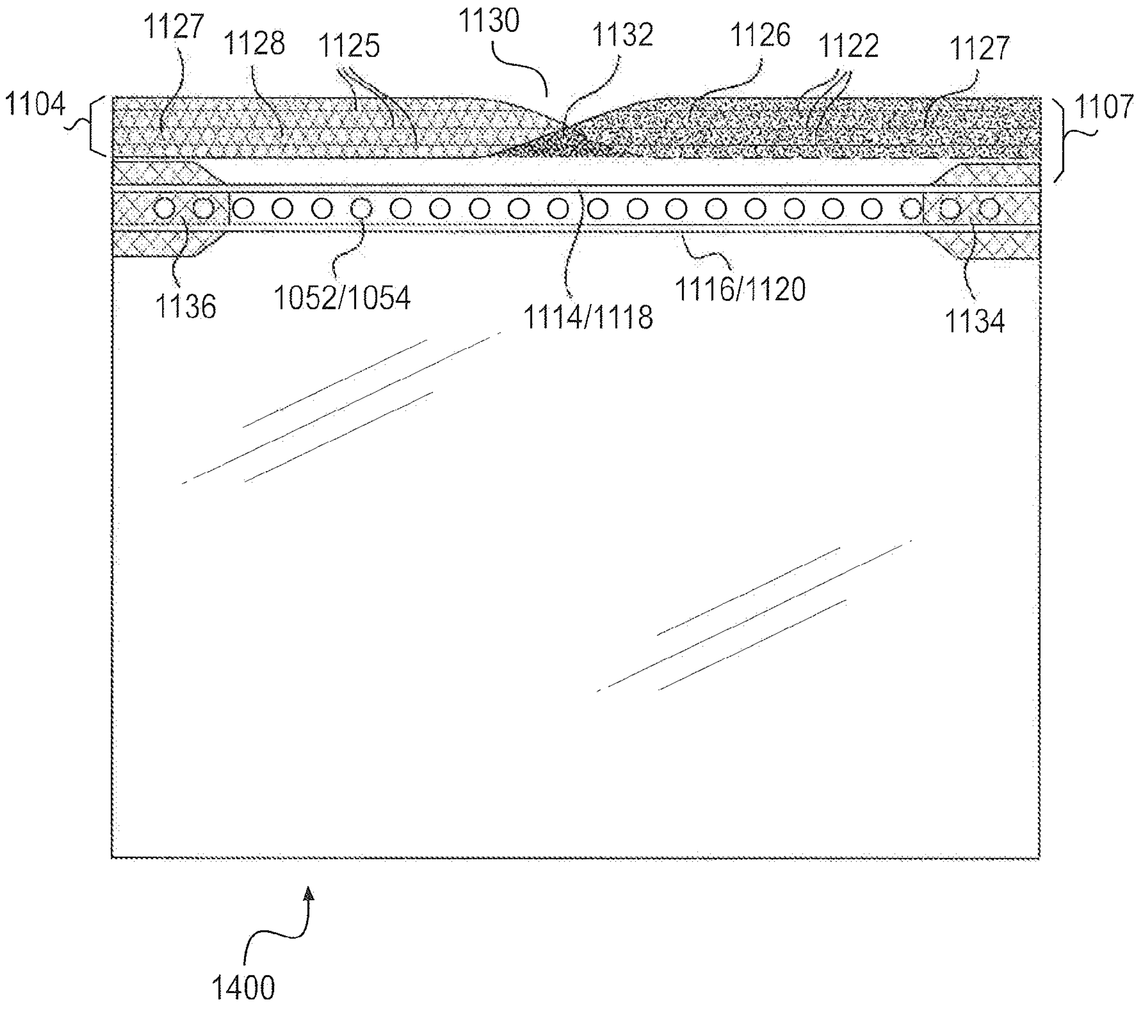
FIG. 24 is a side view of a bag according to another embodiment of the invention.
Figure 25:
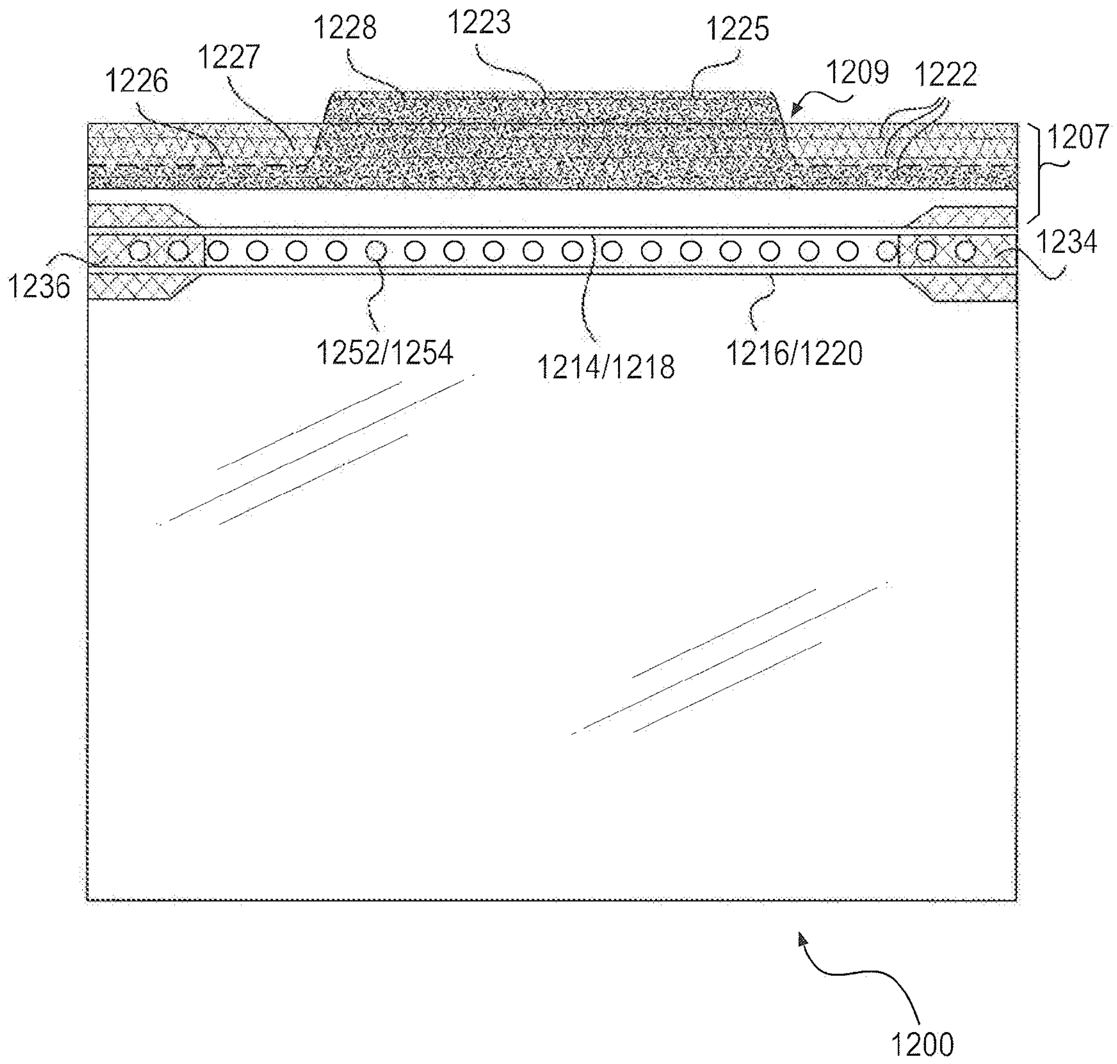
FIG. 25 is a side view of a bag according to another embodiment of the invention.

FIGS. 24 and 25 show bags 1100 and 1200 in embodiments that include combinations of the above-described features. The bag 1100 in FIG. 25 includes lips 1126 and 1128 on closure profiles 1107 and 1109, with the lips 1126 and 1128 having the same shapes as the lips 126 and 128 of the bag 100 described above. As such, a notch 1130 is formed in a center region of the lips 1126 and 1128. The lips 1126 and 1128 also include gripping ridges 1123 and 1125, as well as gripping ridges (not shown) on the opposite sides of the lips 126 and 128, as described above in conjunction with FIG. 2. The lips 1126 and 1128 additionally include texture 1127, which is similar to the texture 127 on the lips 126 and 128 of the bag 100' described above. The lip 1126 is formed as a different color, or as a different shade of color, than the lip 1128, in the manner described above with respect to lips 526 and 528. The bag 1110, therefore, also includes a darkened portion 1132 that is visible when viewing the bag 1100 facing its side surfaces. With this combination of features, the lips 1126 and 1128 are easy for a user to identify, and the user is directed to grasp the areas at the top end of the bag 1100 that allow for easy unsealing of the interlocking members 1114, 1116, 1118, and 1120.

Bag 1100 also includes the above-described features that facilitate sealing of the interlocking members 1114, 1116, 1118, and 1120. Specifically, the bag 1100 includes textured areas 1134 and 1136 at the ends of the interlocking members 1114, 1116, 1118, and 1120, with the textured areas 1134 and 1136. The textured areas 1134 and 1136 provide visual cues directing the user to start a sealing operation at the ends of the interlocking members 1114, 1116, 1118, and 1120, as described above in conjunction with the bag 700. Note, the texture in areas 1134 and 1136 can be made to be visually distinct from the texture 1123 of lips 1126 and 1128 shown in FIG. 24. The bag 1100 also includes dimples 1152 on the first closure profile 1107 and corresponding dimples 1154 on the second closure profile 1109, with the dimples 1152 and 1154 being similar to the dimples 852 and 854 described above in conjunction with the bag 800. The dimples 1152 and 1154 provide an alignment feature, visual indication, and tactile sensation, as described above. It should be noted, however, that while the dimples 1152 and 1154 in FIG. 24 are configured similar to the dimples 852 and 854 in bag 800, in other embodiments the dimples 1152 and 1154 may be formed in any of the other configurations described above, such as the configurations of the dimples 852' and 854' in the bag 800', or the dimples 1057 and 1059 in the bag 1000.

The bag 1200, as shown in FIG. 25, also includes features that facilitate sealing and unsealing the bag 1200. In this embodiment, the lips 1226 and 1228 having the same shape as the lips 216 and 218 described above in conjunction with the bag 200. The lips 1226 and 1128 include gripping ridges 1222 and 1225, as well as corresponding gripping ridges (not shown) on the opposite sides of the lips 1226 and 1128. Texture 1227 is formed on the lips 1226 and 1228, and the lips 1226 and 1228 are provided with color in the same manner as the lips 426 and 428 of the bag 400 described above. The bag 1200 further includes textured areas 1234 and 1236 at the ends of the interlocking members 1214, 1216, 1218, and 1220, as well as dimples 1252 and 1254 positioned adjacent to the interlocking members 1214, 1216, 1218, and 1220. Thus, bag 1200 includes the visual and tactile features that facilitate sealing and unsealing of the interlocking members 1214, 1216, 1218, and 1220, as described above.

The bags 1100 and 1200 may also include any of the other features in the embodiments described above as well. For example, the interlocking members 1114, 1116, 1118, 1120, 1214, 1216, 1218, and 1220, as well as the dimples 1152, 1154, 1252, and 1254 can be configured to produce audible feedback, in the manner described above.

All of the bags shown in FIGS. 1 to 25 have a substantially rectangular configuration. Any of the bags described above, however, could be provided in a non-rectangular shape. The bag 1300 shown in FIG. 26 demonstrates such a non-rectangular shape. The bag 1300 includes edges 1306, 1308, and 1310. Between the edges 1306 and 1310, and between 1308 and 1310, are curved edges 1303 and 1310. Such curved edges may have, for example, a 0.75 in. or a 1.5 in. radius of curvature. Those skilled in the art will recognize numerous other shapes in which the bags described herein could be formed.

As is evident from the disclosure and depictions of the embodiments described above, some of the bags according to the invention differ from conventional bags by appearing asymmetric about one or more points of the bag. Conventional bags often appear symmetric at least, for example, when looking at the side surfaces of the bag. Bags according to the present invention, however, do not necessarily appear symmetric when one is looking at one or more surfaces of the bag. As will be described below, besides providing for a visually interesting and distinguishable bag, the asymmetries of the bag may further facilitate opening of the bag.

A bag according to the invention may appear asymmetric in multiple ways as a result of one or more visually distinct features. A visually distinct feature, as used herein, means a feature that can readily be discerned from other surrounding features of the bag, or a feature that can readily be discerned from a corresponding visually distinct feature on another part of the bag. Similarly, a visually distinct area, as used herein, means an area of the bag that can readily be discerned from surrounding areas of the bag, or an area that can readily be discerned from a corresponding visually distinct area of another part of a bag. Thus, a visually distinct feature may, in effect, create visually distinct areas.

One example of a visually distinct feature that has been discussed above is the gripping ridges, which can readily be discerned from the surrounding portions of the bag. Similarly, an area of the bag that is provided with gripping ridges can be visually distinguished from other areas of the bag that do not include gripping ridges. Another example of a visually distinct feature that can readily be discerned from a corresponding visually distinct feature on another part of the bag is the color of a first lip being different from the color of a second lip. As yet another example, the texture of the first lip may be a visually distinct feature that is different from the corresponding texture (or lack of texture) on the second lip. A non-exhaustive list of features of a bag according to the invention that can constitute a visually distinct feature or create visually distinct area so as to make the bag appear to be asymmetrical includes texture, color, gripping ridges and corresponding portions that are differently shaped (e.g., one lip having a different shape than the other lip). With each of these features, the lack of a corresponding feature on a corresponding portion of the bag can also create visual distinctness, e.g., having gripping ridges being visible on one lip of the bag but no gripping ridges being visible on a corresponding lip of the bag when the bag is viewed towards one of its surfaces.

Figure 27:
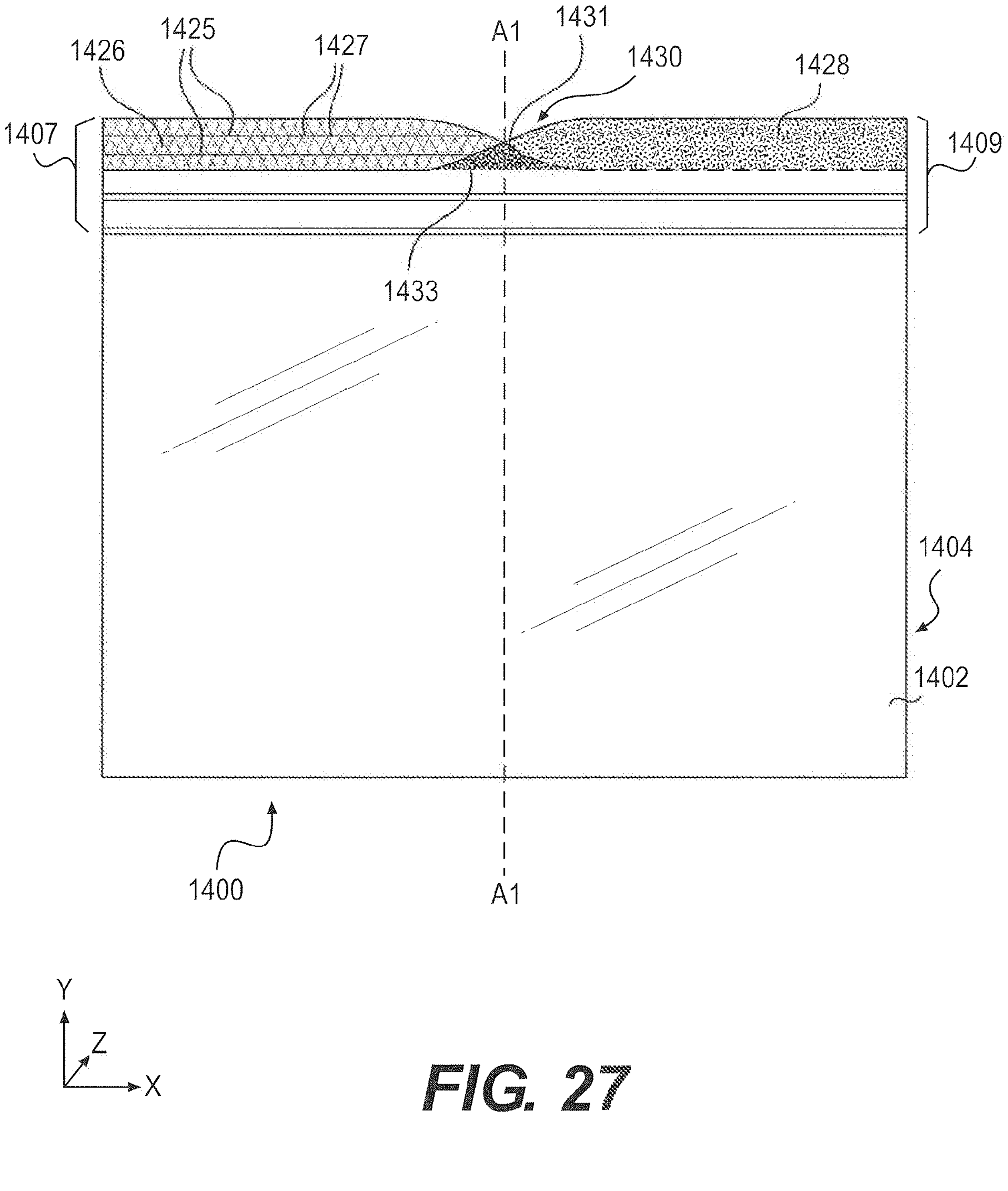
FIG. 27 is a side view of a bag according to another embodiment of the invention.
Figure 28:
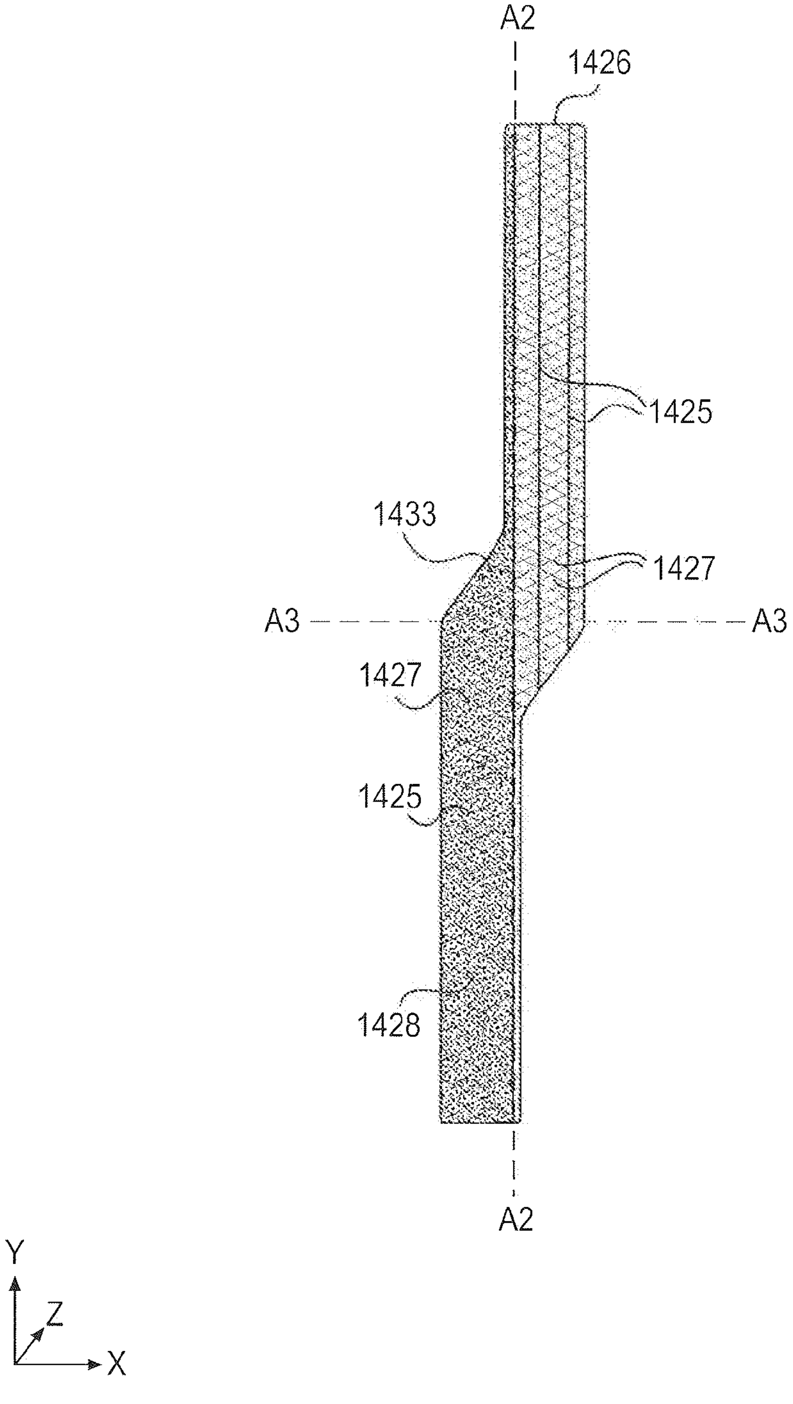
FIG. 28 is a top view of the bag shown in FIG. 27.

The asymmetry of a bag 1400 resulting from visually distinct features and visually distinct areas is shown in FIGS. 27 and 28. In these Figures, x-, y-, and z-directions of the bag 1400 have been denoted. In FIG. 27, a line A1 has been drawn in the y-direction that bisects the first side surface 1402 of the bag. In FIG. 28, a line A2 has been drawn in the z-direction, and a line A3 has been drawn in the x-direction. Note that these are imaginary lines in the sense that they are not actually a part of the structure of the bag 1400, but rather, will be used to denote asymmetries of the bag 1400.

As is evident from FIG. 27, when the bag 1400 is viewed towards the first side surface 1402 the bag 1400 appears asymmetric about the line A1. In this embodiment, the asymmetry arises because of two pairs of visually distinct features, namely, the gripping ridges 1425 and the texture 1427. The bag also appears asymmetric due to the color or shade of color of the lips 1426 and 1428, and as a result of an overlapping portion 1433 of the lip 1428 on lip 1426.

Both of the gripping ridges 1425 and texture 1427 are provided on the inside surfaces of the lips 1426 and 1428, but not on the outside surfaces of the lips 1426 and 1428. When viewing the bag 1400 towards the first side surface 1402, the gripping ridges 1425 and texture 1427 are visible on the lip 1426 but not the lip 1428. Although not shown, if the bag 1400 is viewed towards the second side surface 1404, the gripping ridges 1425 and texture 1427 are visible on lip 1428 but not lip 1426. Thus, the bag appears asymmetric about line A1, with the gripping rides 1425 and texture 1427 on the lip 1426 on one side of the line A1 and the lack of gripping ridges and texture 1427 on the lip 1428 on the other side of the line A1.

The bag 1400 includes a further pair of visually distinct features in the coloring and overlapping of the lips 1426 and 1428. The lips 1426 and 1428 are different colors, or different shades of a color, with the different colors or different shades of color being provided in the manner described above. Further, when the bag 1400 viewed towards the first side surface 1402, a portion 1433 of the edge of lip 1428 can be seen on the side of the line A1 where the lip 1428 can be seen. Thus, the overlapping portion 1433 provides yet another asymmetry when viewing the first side surface 1402 of the bag.

While the coloring of the lips 1426 and 1428 creates a further asymmetry about line A1 when the bag 1400 is viewed towards the first side surface 1402, the darker portion 1431 that is formed by the overlapping of the first and second lips 1426 and 1428 is a visually distinct area that is symmetric about line A1. This symmetric darker portion 1431 will aid in characterizing the gripping portions of the bag 1400, as will be described below.

It should be apparent that if the bag 1400 were viewed towards the second side surface 1404, i.e., opposite to that which is shown in FIG. 27, many of the same asymmetries may be present, though reversed from those shown in FIG. 27. For example, the gripping ridges 1425 and the texture 1427 can be seen on lip 1428, but not lip 1426, when the bag is viewed towards the second side surface 1404. And, of course, the different coloring or different shades of coloring of the lips 1426 and 1428, as well as an overlapping portion of the lips 1426 and 1428 can be seen when the bag 1400 is viewed towards the second side surface 1404. Thus, while the first and second closure profiles 1407 and 1409, and in particular, areas of the lips 1426 and 1428 of the first and second closure profiles 1407 and 1409, appear to be different when the bag 1400 is viewed towards the first side surface 1402 than when the bag is viewed towards the second side surface 1404, the same asymmetries are still present in a similar manner regardless of which side surface of the bag 1400 is being viewed.

FIG. 28 is a top view of the bag 1400, with the lips 1426 and 1428 partially unfolded. In FIG. 28, a line A2 has been drawn in the y-direction of the bag 1400, and a line A3 has been drawn in the z-direction of the bag 1400. As is evident from this Figure, the bag 1400 is provided with visually distinct features so as to appear asymmetric about both line A2 and about line A3. The asymmetries arise from the same visually distinct features and visually distinct areas described above, as well as from further visually distinct features and areas. In particular, note that the different shapes of the lips 1426 and 1428 create an asymmetry about both lines A2 and A2. This asymmetry is in addition to the asymmetries created by the gripping ridges 1425, texture 1427, and coloring of the lips 146 and 1428 about lines A2 and A3.

The asymmetries created by the visually distinct features and visually distinct areas aid a user in the unsealing of the bag 1400 by providing further visual cues as to how the bag should be grasped when being open. That is, the asymmetries themselves provide visual cues that lead the user to grasp the first and second lips 1426 and 1428 in the region of the notch 1430 formed in the lips 1426 and 1428. For example, the asymmetric parts naturally lead the user to grasp the different lips 1426 and 1428 with their right and left hands. Further, the user may be guided by the symmetric darker portion 1431 created by the overlap of the lips 1426 and 1428 such that the user will grasp the asymmetric portions about the symmetric portion. The result is that the user is led to grasp the asymmetric lips in the notch 1430 region adjacent to the symmetric darker portion 1431. As discussed in detail above, grasping the bag 1400 in this region facilitates a rolling motion for opening the bag, which is an effective and efficient manner of opening the bag 1400.

It is surprising that the functionality of a storage bag is improved by intentionally making the bag appear to be asymmetric. As those skilled in the art will certainly appreciate, conventional storage bags are made to look as symmetrical as possible for ease of use and based on the idea that symmetry is aesthetically pleasing. The specific provision of asymmetrical elements, and, in particular, asymmetrical elements adjacent to the opening of the storage bag, is a novel and non-obvious concept in the art that results in a more functional storage bag.

Figure 26:
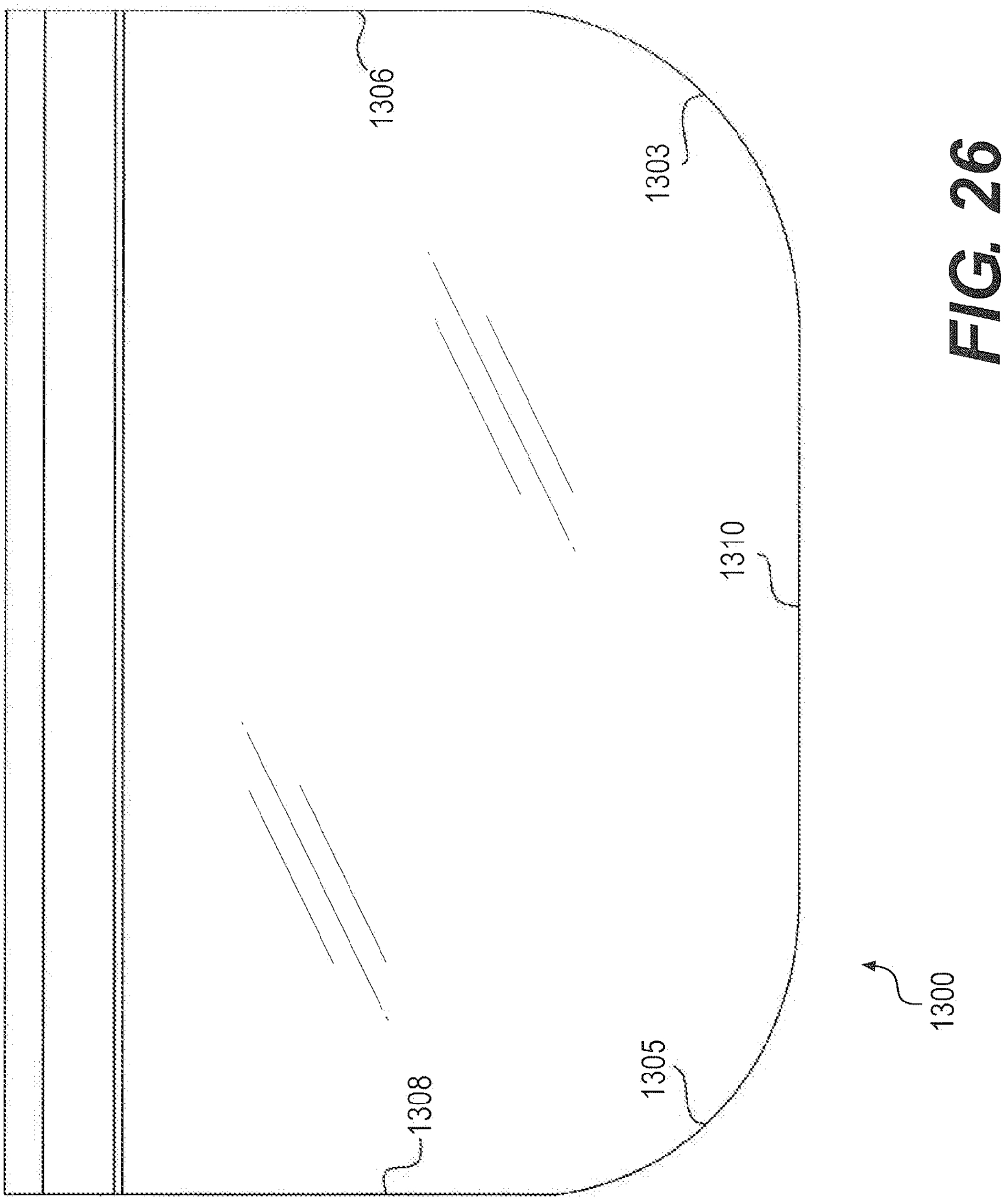
FIG. 26 is a side view of a bag according to a further embodiment of the invention.

It should be noted that, while a specific example of a bag 1400 with visually distinct features that create asymmetries is shown in FIGS. 25 and 26, many other configurations of bags are possible with more or less visually distinct features, and accordingly, more or less asymmetries. For example, a bag according to another embodiment of the invention might include visually distinct gripping ridges, but not visually distinct textures. In further embodiments, the gripping ridges and/or textures might be provided on the outside surfaces of the lips 1426 and 1428, but not the inside surfaces of the lips 1426 and 1428. Additionally, although with the configuration of the bag 1400 the imaginary lines A1, A2, and A3 are drawn so as to bisect the bag 1400 in the x-, y-, and z-directions, those skilled in the art will recognize that in other configurations the line or lines about which asymmetries are formed may not bisect surfaces of the bag, but rather may be off set from bisecting positions.

Figure 29:
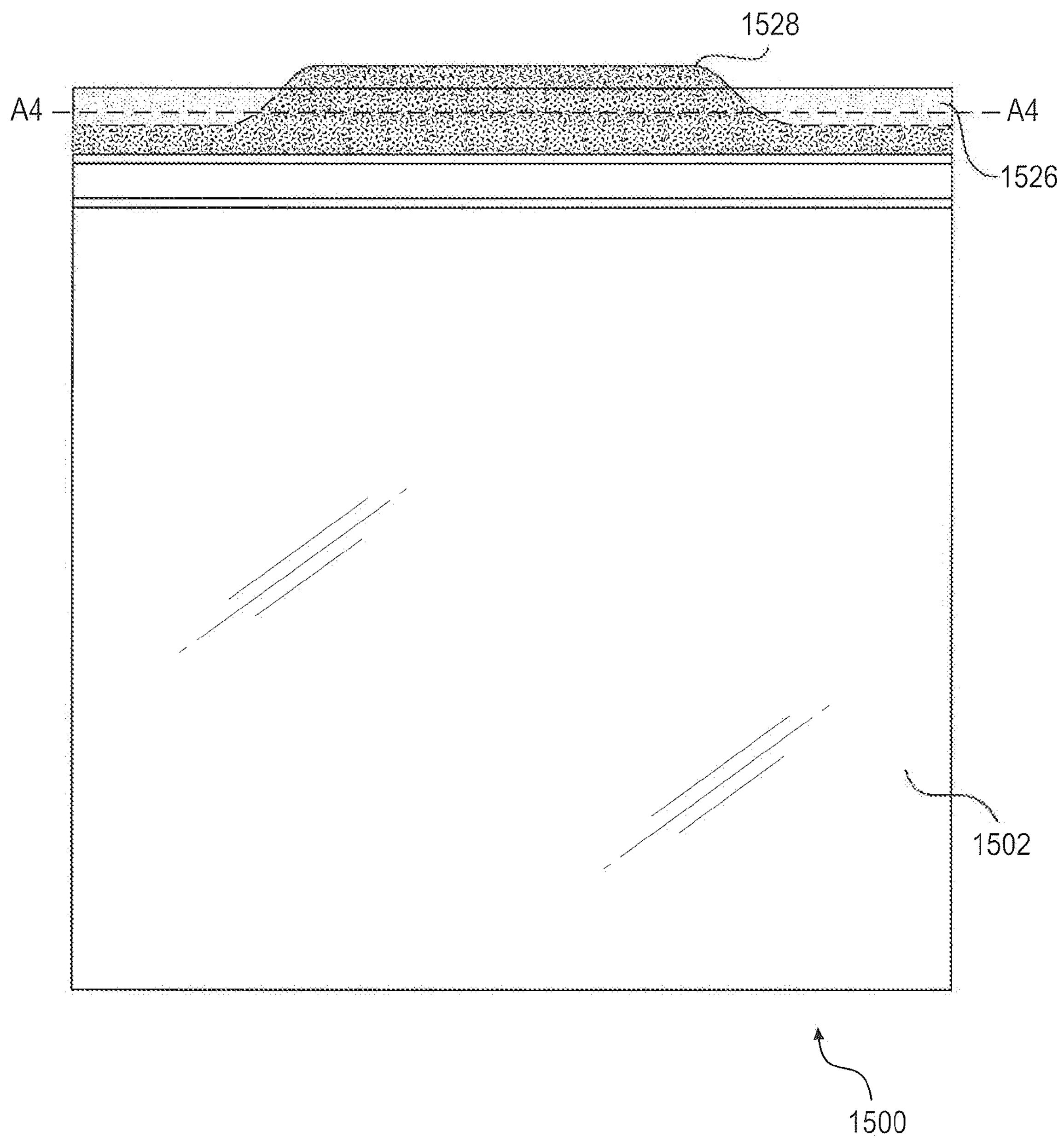
FIG. 29 is a side view of a bag according a further embodiment of the invention.

FIG. 29 demonstrates how visually distinct features and visually distinct areas can form asymmetries in a bag 1500 that has differently shaped lips 1526 and 1528. In this regard, the bag 1500 has a substantially similar configuration to the bag 600 shown in FIG. 13 of this application. An imaginary line A4 has been drawn in the y-direction across the lips 1526 and 1528 of the bag 1500. In this case, both the shape and the coloring of the lips 1526 and 1528 create asymmetries about the line A4. Thus, with the configuration of the closure profiles of bag 1500 providing asymmetries about line A4, a user can easily distinguish the two different lips 1526 and 1528. This again facilitates the user grasping the lips 1526 and 1528 when opening the bag 1400.

In addition to facilitating the opening and/or the closing of a bag according to the invention, the asymmetrical aspects of the bag may also facilitate manufacturing of the bag. For example, a pair of asymmetrical aspects of a bag that are on separately formed portions of the bag may be easier to align and attach together when the separate portions are combined to form the bag. As another example, distinct asymmetrical aspects naturally allow for more variance in the bag structure without making the bag appear to be defective. That is, if a bag is intended to look symmetrical in most aspects, then any variance in a symmetrical aspect may imply to a user that the bag is defective. Thus, there must be close control of the manufacturing process to ensure that the aspects do, in fact, look symmetrical. On the other hand, if a bag is intended to look asymmetrical in some aspects, then the natural variance in different portions of the bag allows for more tolerance in manufacturing without the bag appearing to be defective. Further examples of how the asymmetrical and other aspects of the bag facilitate manufacturing can be seen in the following embodiments.

Figure 30:
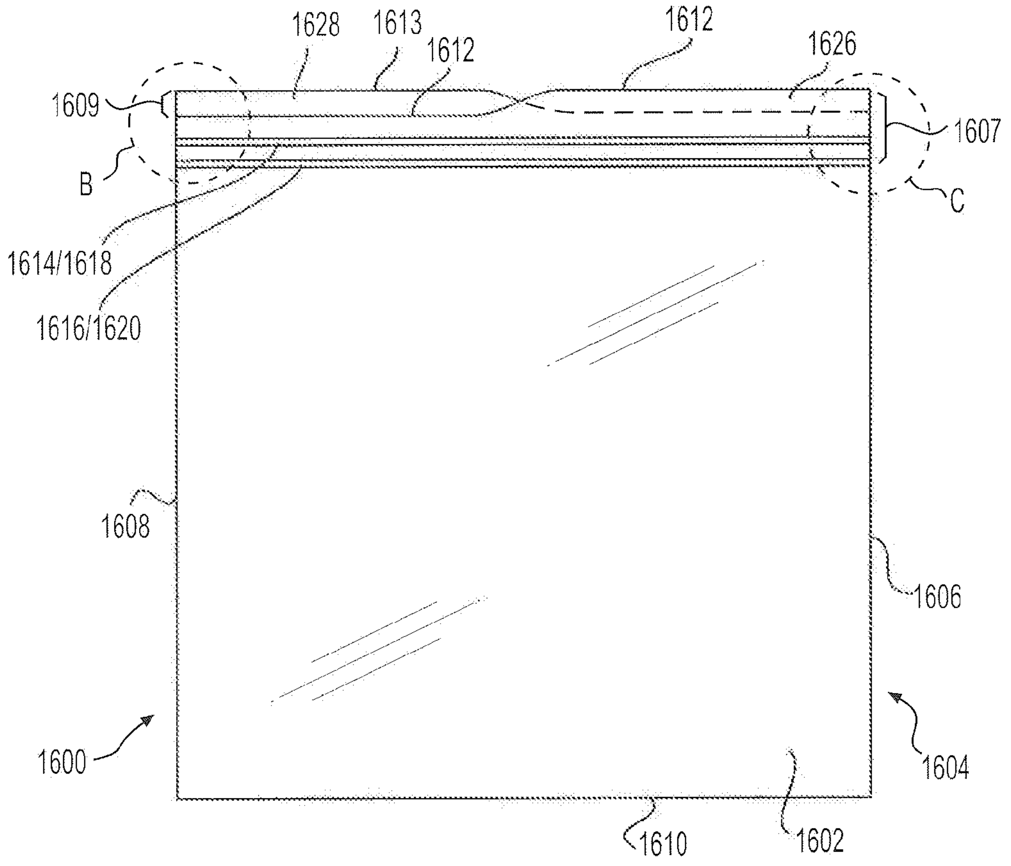
FIG. 30 is a side view of a bag according to yet another embodiment of the invention.

FIG. 30 is a side view of a bag 1600 according to a further embodiment of the invention. The bag 1600 has a similar shape to the bag 100 shown in FIGS. 1-4. The bag 1600 includes a first side surface 1602 and a second side surface 1604. The first and second side surfaces 1602 and 1604 are connected along edges 1606 and 1608, and the first and second surfaces 1602 and 1604 are connected at a bottom edge 1610. The bag 1600 also includes top edges 1612 and 1613 that are defined by closure profiles 1607 and 1609. The closure profiles 1607 and 1609 include interlocking members 1614, 1616, 1618, and 1620 for sealing an opening of the bag 1600, and the closure profiles define lips 1626 and 1628 of the bag 1600.

Figure 31:
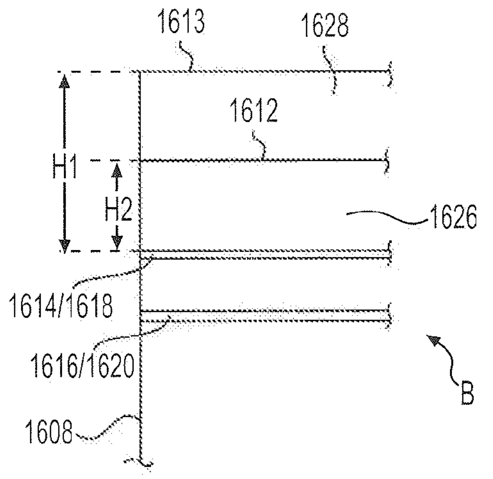
FIG. 31 is a detailed view of Section B shown in FIG. 30.

The top edges 1612 and 1613 of the bag 1600 at a side adjacent to ends of closure profiles 1607 and 1609 are shown in Section B of FIG. 30. Section B is shown in detail in FIG. 31. At the end of the bag 1600 shown in FIG. 31, the top edge 1613 of the second closure profile 1609 extends a distance H1 from the first and second interlocking members 1614 and 1618, and the top edge 1612 of the first closure profile 1607 extends a distance H2 from the first and second interlocking members 1614 and 1618. The closure profiles are configured such that the distance H1 is greater than the distance H2. That is, the top edge 1613 of the second closure profile 1609 is spaced from the top edge 1612 of the first closure profile 1607 at this end of the first and second closure profiles 1607 and 1609.

Figure 32:
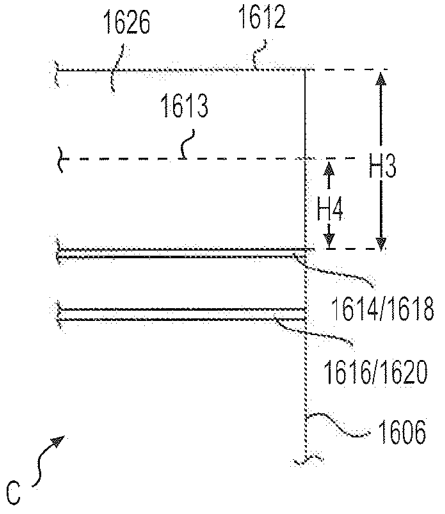
FIG. 32 is a detailed view of Section C shown in FIG. 30.

The top edges 1612 and 1613 of the bag 1600 at the side adjacent to the other end of the closure profiles 1607 and 1609 are shown in Section C of FIG. 30. Section C is shown in detail in FIG. 32. At this end, the top edge 1612 of the first closure profile 1607 extends a distance H3 from the interlocking members 1614 and 1618, and the top edge 1613 of the second closure profile 1609 extends a distance H4 from the interlocking members 1614 and 1618. The bag 1600 is configured such that the distance H3 is greater than the distance H4. That is, the top edge 1612 of the first closure profile 1607 is spaced from the top edge 1613 of the second closure profile 1609 at this end of the first and second closure profiles 1607 and 1609.

The spacing of the top edges 1612 and 1613 at the ends of the closure profiles 1607 and 1609 may allow for easier manufacturing of the bag 1600. For example, the spacing of the top edges 1612 and 1613 provides more tolerance in the design inasmuch as the top edges 1612 and 1613 need not be precisely aligned to each other at the ends of the closure profiles 1607 and 1609.

Figure 33:
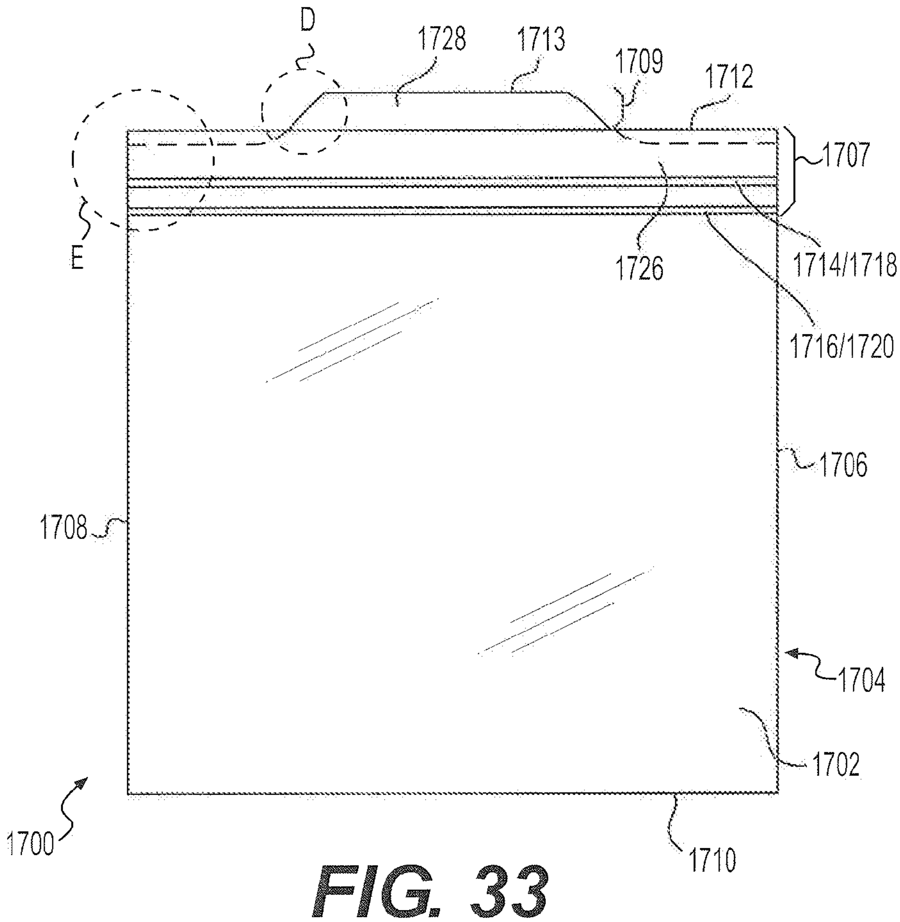
FIG. 33 is a side view of a bag according to a further embodiment of the invention.

FIG. 33 is a side view of a bag 1700 according to a further embodiment of the invention. The bag 1700 has a similar shape to the bag 200 depicted in FIGS. 6 and 7. The bag 1700 includes a first side surface 1702 and a second side surface 1704. The first and second side surfaces 1702 and 1704 are connected along the side edges 1706 and 1708 and the bottom edge 1710. The bag 1700 also includes top edges 1712 and 1713 that are defined by closure profiles 1707 and 1709. The closure profiles 1707 and 1709 include interlocking members 1714, 1716, 1718, and 1720 for sealing an opening of the bag 1700, and the closure profiles define lips 1726 and 1728 of the bag 1700.

Figure 34:
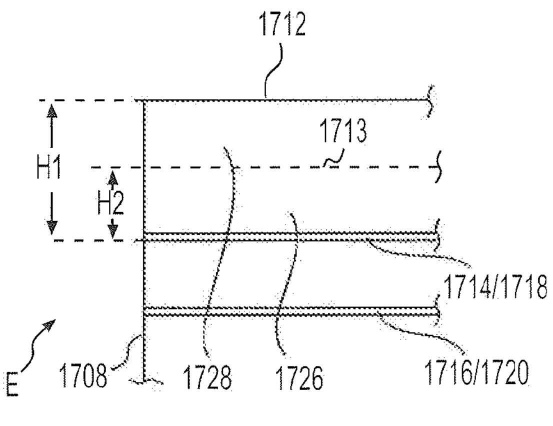
FIG. 34 is a detailed view of Section D shown in FIG. 33.

The top edges 1712 and 1713 of the bag 1700 at a side adjacent to ends of the closure profiles 1707 and 1709 are shown in Section E of FIG. 33. Section E is shown in detail in FIG. 34. The top edge 1712 of the first closure profile 1707 extends a distance H1 from the first and second interlocking members 1714 and 1718, and the top edge 1713 of the second closure profile 1709 extends a distance H2 from the first and second interlocking members 1714 and 1718. The closure profiles 1707 and 1709 are configured such that the distance H1 is greater than the distance H2. That is, the top edge 1712 of the first closure profile 1707 is spaced from the top edge 1713 of the second closure profile 1709 at the ends of the first and second closure profiles 1707 and 1709. Note, in this embodiment, the other end of the bag adjacent to the edge 1706 has the same configuration as the end adjacent to edge 1708. Again, the spacing of the top edges 1712 and 1713 at the ends of the closure profiles 1707 and 1709 may allow for easier manufacturing of the bag 1700.

Figure 35:
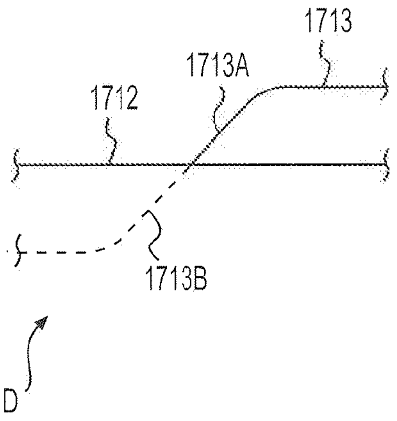
FIG. 35 is a detailed view of Section E shown in FIG. 33.

Portions of the lips 1726 and 1728 are shown in Section D of FIG. 30. Section D is shown in detail in FIG. 35. The portion of the top edge 1713 of lip 1728 in Section D includes a section 1713A above the top edge 1712 and a section 1713B below the top edge 1712. The sections 1713A and 1713B are sloped relative to the top edge 1712 of the lip 1728. That is, the sections 1713A and 1713B are sloped in that they appear to extend at angles relative to the top edge 1712 when the bag is viewed towards the first or second side surfaces 1702 and 1704. As a result of the sloped sections 1713A and 1713B, portions of the top edges 1712 and 1713 are offset so as to not be mirror images of each other about a plane that bisects the offset of the edges 1712 and 1713. In fact, these portions of the top edges 1712 and 1713 are offset so as to not be mirror images of each other about any plane that extends through at least one of the first and second closure profiles 1707 and 1709 at a perpendicular angle to the first and second closure profiles 1707 and 1709.

Figure 36A:
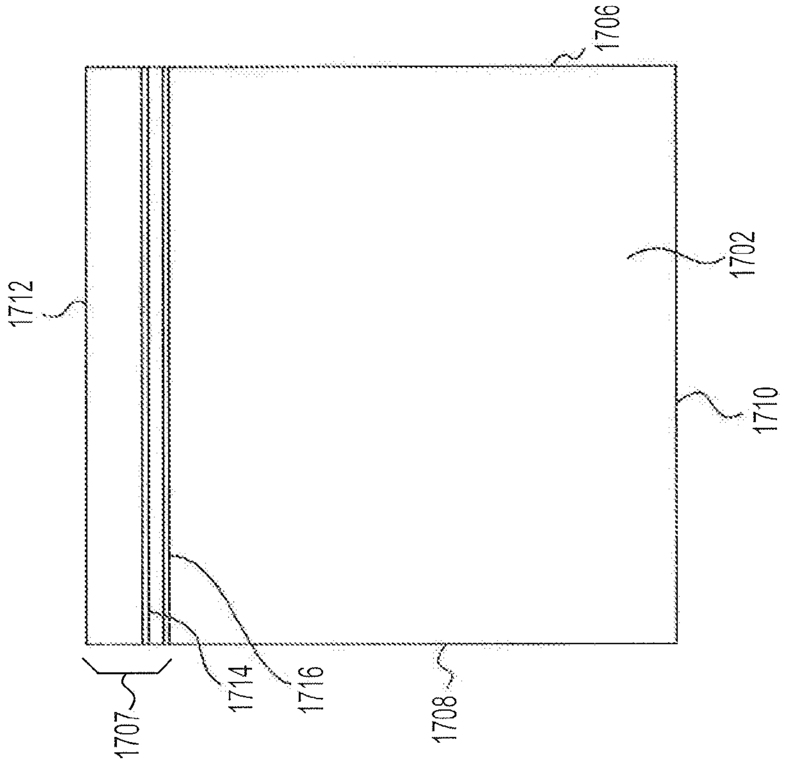
FIGS. 36A and 36B are views of the two sides of the bag shown in FIG. 33.
Figure 36B:
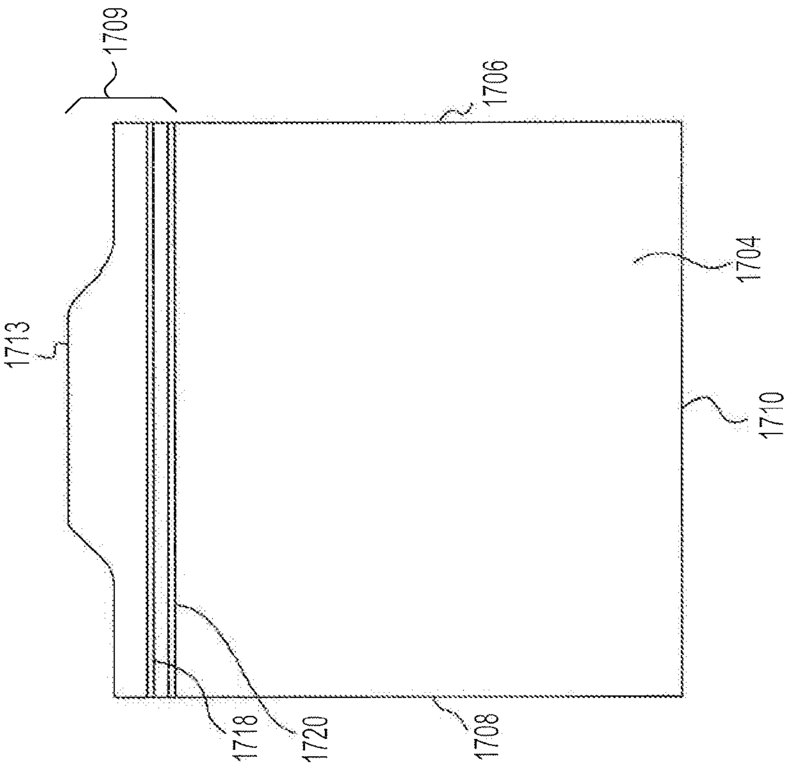

FIGS. 36(A) and 36(B) show the two side surfaces 1702 and 1704 of bag 1700 separated from each other. As is evident from a comparison of these figures, the outline of the area defined by the first side surface 1702 and first closure profile 1707 is different from the outline of the area defined by the second side surface 1704 and the second closure profile 1709. That is, the outlines of the areas defined by the two sides of the bag 1700 have different shapes such that the two sides cannot be matched to each other. As discussed above, such an asymmetry in the two sides of the bag 1700 may make easier the manufacturing of the bag 1700.

It is contemplated that any of the bags described herein could be formed as a vacuum storage bag. In such embodiments, at least one vacuum check valve is provided on a surface of the bag, with the valve allowing for fluid communication with the interior of the bag. A vacuum device, such as a manual or electrical pump, or even a household vacuum cleaner, may be placed over the valve to draw out gases or other fluids from the interior of the bag. The vacuum bag configuration may also include relief on or along interior surfaces of the bag to provide air flow channels when a vacuum is drawn through the vacuum check valve. Examples of vacuum bags are sold under the SPACE BAG® tradename, and examples of such vacuum bags can be seen in U.S. Pat. Nos. 6,983,845; 8,096,329; 8,197,138; and 8,197,139, and U.S. Patent Application Publication No. 2012/0099806, the disclosures of which are incorporated by reference herein in their entirety.

Although this invention has been described with respect to certain specific exemplary embodiments, many additional modifications and variations would be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application, and the equivalents thereof, rather than by the foregoing description.

INDUSTRIAL APPLICABILITY

The invention described herein can be used in the commercial production of storage bags. Such storage bags have a wide variety of uses, such as being utilized to store food, chemicals, or other substances.

We claim:

1. A resealable storage bag comprising:

(A) a first side wall;

(B) a second side wall connected to the first side wall, the connected first and second side walls forming an interior of the bag with an opening to the interior of the bag;

(C) a first closure profile connected to the first side wall and positioned adjacent to the opening of the bag, the first closure profile (a) including an interlocking member that extends between a first end of the first closure profile and a second end of the first closure profile, and (b) having a straight, top edge that extends substantially parallel to the interlocking member from the first end of the first closure profile to the second end of the first closure profile, the first closure profile forming a lip between the interlocking member and the top edge of the first closure profile, with the lip (a) having an inner surface and an outer surface, (b) having a first shape that extends a substantially constant distance H1 (i) from the interlocking member to the top edge of the first closure profile and (ii) between the first end of the first closure profile and the second end of the first closure profile, and (c) including a pair of visually distinct features, with each visually distinct feature of the pair of visually distinct features being provided on at least one of the inner surface and the outer surface of the lip, the pair of visually distinct features comprising (i) a color on the inner surface and the outer surface of the lip of the first closure profile, and (ii) gripping ridges on only the inner surface of the lip of the first closure profile; and (D) a second closure profile connected to the second side wall and positioned adjacent to the opening of the bag, the second closure profile (a) including an interlocking member that extends between a first end of the second closure profile and a second end of the second closure profile, the interlocking member of the second closure profile being configured to interlock and to unlock with the interlocking member of the first closure profile, thereby to seal, to unseal, and to reseal the opening of the bag, and (b) having a top edge that extends from the first end of the second closure profile to the second end of the second closure profile, the second closure profile forming a lip between the interlocking member and the top edge of the second closure profile, with the lip (a) having an inner surface and an outer surface, (b) having a second shape that extends a varying distance (i) from the interlocking member to the top edge of the second closure profile and (ii) between the first end of the second closure profile and the second end of the second closure profile, with the second shape differing from the first shape, such that the second shape of the lip of the second closure profile consists of only (1) a first portion that extends a substantially constant distance H2 from the interlocking member to the top edge of the second closure profile along a portion of the length of the second closure profile starting from the first end, (2) a second portion that extends a substantially constant distance H3 from the interlocking member to the top edge of the second closure profile along a portion of the length of the second closure profile starting from the second end, (3) a third portion provided between the first portion of the lip and the second portion of the lip, with the third portion extending a substantially constant distance H4 from the interlocking member to the top edge of the second closure profile, wherein the distance H4 is greater than each of the distances H1, H2, and H3, and the distance H1 is greater than each of the distances H2 and H3, (4) a fourth portion provided between the first portion of the lip and the third portion of the lip, with the fourth portion extending a distance from the interlocking member to the top edge of the second closure profile that varies from H2 to H4, such that the fourth portion gradually transitions from H2 to H4, and (5) a fifth portion provided between the second portion of the lip and the third portion of the lip, with the fifth portion extending a distance from the interlocking member to the top edge of the second closure profile that varies from H3 to H4, such that the fifth portion gradually transitions from H3 to H4, and the third portion, fourth portion, and fifth portion of the lip of the second closure profile create a center region of the lip of the second closure profile that (i) extends above the top edge and the lip of the first closure profile, and (ii) is sized to accommodate a thumb and a finger of a user, wherein the top edge of the second closure profile extends substantially parallel to (i) the interlocking member of the second closure profile in each of the first portion, the second portion, and the third portion of the lip of the second closure profile, and (ii) the top edge of the first closure profile in each of the first portion, the second portion, and the third portion of the lip of the second closure profile, and the fourth portion and the fifth portion of the lip of the second closure profile are sloped relative to the top edge of the first closure profile, to provide the second shape of the lip of the second closure profile, and (c) including a pair of visually distinct features, with each visually distinct feature of the pair of visually distinct features being provided on at least one of the inner surface and the outer surface of the lip, the pair of visually distinct features comprising (i) a color on the inner surface and the outer surface of the lip of the second closure profile, and (ii) gripping ridges on only the inner surface of the lip of the second closure profile, wherein the bag has an asymmetric appearance, when the bag is viewed toward at least the first side wall, as a result of (a) the first shape of the lip of the first closure profile differing from the second shape of the lip of the second closure profile, due to the respectively defined distances of H1, H2, H3, and H4, with the distance H4 being greater than each of the distances H1, H2, and H3, and the distance H1 being greater than each of the distances H2 and H3, (b) the pair of visually distinct features of the lip of the first closure profile and the pair of visually distinct features of the lip of the second closure profile, and (c) the center region of the lip of the second closure profile that is created by the third portion, the fourth portion, and the fifth portion of the lip of the second closure profile, extending above the top edge and the lip of the first closure profile, and being sized to accommodate the thumb and the finger of the user, and wherein the asymmetric appearance and the center region being sized to accommodate the thumb and the finger of the user, together, provide a visual cue to the user as to where to grasp the lips of the first and second closure profiles when the opening of the bag is sealed, thus facilitating a separation of the first and second closure profiles by the user, in order to unseal the opening of the bag by imparting an outward rolling motion to the lips of the first and second closure profiles.

2. The storage bag according to claim 1, wherein at least one of the lip of the first closure profile and the lip of the second closure profile further includes another visually distinct feature, in combination with the pair of visually distinct features.

3. The storage bag according to claim 2, wherein the other visually distinct feature is provided on the inner surface of the at least one of the lip of the first closure profile and the lip of the second closure profile.

4. The storage bag according to claim 1, wherein the lip of the second closure profile further includes another visually distinct feature that is a texture.

5. The storage bag according to claim 1, wherein the color on the lip of the first closure profile and the color on the lip of the second closure profile are both formed by extrusion.

6. The storage bag according to claim 1, wherein the color of the lip of the second closure profile is one of (i) a different color than the color of the lip of the first closure profile and (ii) a different shade of the color of the lip of the first closure profile.

7. The storage bag according to claim 1, wherein the top edge of the second closure profile extends substantially parallel to the interlocking member of the first closure profile in each of the first portion, the second portion, and the third portion of the lip of the second closure profile.

8. The storage bag according to claim 1, wherein the lip of the first closure profile further includes another visually distinct feature that is a texture.

9. The storage bag according to claim 1, wherein at least a first area of the lip of the second closure profile is not overlapped by the lip of the first closure profile, and at least a second area of the lip of the second closure profile is overlapped by the lip of the first closure profile.

10. The storage bag according to claim 9, wherein the bag has an asymmetric appearance, when the bag is viewed toward at least the first side wall, as a result of (a) the first area of the lip of the second closure profile that is not overlapped by the lip of the first closure profile appearing as the color of the lip of the second closure profile, and (b) the second area of the lip of the second closure profile that is overlapped by the lip of the first closure profile appearing as one of (i) a different color than the color of the lip of the second closure profile and (ii) a different shade of the color of the lip of the second closure profile.

11. The storage bag according to claim 1, wherein the interlocking member of the first closure profile interlocks with the interlocking member of the second closure profile, when sealing and resealing the opening of the bag.

12. The storage bag according to claim 1, wherein the interlocking member of the first closure profile unlocks from the interlocking member of the second closure profile, when unsealing the opening of the bag.

* * * * *